US011371641B2

(12) United States Patent
Parlane et al.

(10) Patent No.: US 11,371,641 B2
(45) Date of Patent: Jun. 28, 2022

(54) CABLE MANAGEMENT APPARATUS AND SYSTEM

(71) Applicant: Optical Metrology Services Ltd, Stansted (GB)

(72) Inventors: Jack Francis Parlane, Stansted (GB); Timothy Alan Clarke, Stansted (GB)

(73) Assignee: OPTICAL METROLOGY SERVICES LTD, Stansted (GB)

(*) Notice: Subject to any disclaimer, the term of this patent is extended or adjusted under 35 U.S.C. 154(b) by 34 days.

(21) Appl. No.: 16/628,648

(22) PCT Filed: Jul. 9, 2018

(86) PCT No.: PCT/GB2018/051943
§ 371 (c)(1),
(2) Date: Jan. 3, 2020

(87) PCT Pub. No.: WO2019/008397
PCT Pub. Date: Jan. 10, 2019

(65) Prior Publication Data

US 2020/0217442 A1 Jul. 9, 2020

(30) Foreign Application Priority Data

Jul. 7, 2017 (GB) ..................................... 1711002

(51) Int. Cl.
*F16L 55/40* (2006.01)
*F16L 3/18* (2006.01)
*F16L 9/18* (2006.01)

(52) U.S. Cl.
CPC ................. *F16L 55/40* (2013.01); *F16L 3/18* (2013.01); *F16L 9/18* (2013.01)

(58) Field of Classification Search
CPC ................ F16L 55/40; F16L 3/18; F16L 9/18
(Continued)

(56) References Cited

U.S. PATENT DOCUMENTS 4,478,278 A * 10/1984 Klein .................. E21B 17/1035 138/108
5,920,032 A * 7/1999 Aeschbacher ........ E21B 17/206 174/47

(Continued)

FOREIGN PATENT DOCUMENTS

EP 2 949 937 A1 12/2015
FR 2 517 410 A1 6/1983

OTHER PUBLICATIONS

International Search Report and Written Opinion for Int'l Appl. No. PCT/GB2018/051943, entitled: Cable Management Apparatus and System, dated Sep. 28, 2018.

*Primary Examiner* — Craig M Schneider
*Assistant Examiner* — David R Deal
(74) *Attorney, Agent, or Firm* — Hamilton, Brook, Smith & Reynolds, P.C.

(57) ABSTRACT

There is presented a cable management apparatus for deployment within a pipe, where the pipe houses at least a portion of an umbilical cable. The cable management apparatus comprises a first engagement portion for engaging with an interior surface of the pipe, a second engagement portion for engaging with the umbilical cable, a first end and a second end. The cable management apparatus is configured such that, in use, the umbilical cable extends outwardly and away along the pipe, in substantially opposite directions from the first and second ends. The cable management apparatus is further configured to assist the moving of the umbilical cable along a lengthwise portion of the pipe using at least the first engagement portion and/or the second engagement portion.

17 Claims, 16 Drawing Sheets

12
10
14
10

(58) Field of Classification Search
USPC .......................................................... 138/112
See application file for complete search history.

(56) References Cited

U.S. PATENT DOCUMENTS

| | | | | |
|---|---|---|---|---|
| 6,158,475 | A * | 12/2000 | Clemmer | F16L 7/00 138/108 |
| 6,431,079 | B1 * | 8/2002 | Appleton | F16L 55/40 104/138.2 |
| 8,727,024 | B2 * | 5/2014 | Decker | E21B 19/12 166/385 |
| 8,875,792 | B2 * | 11/2014 | Whitelaw | F16L 3/237 166/345 |
| 2004/0144439 | A1 | 7/2004 | Lundman | |
| 2007/0286682 | A1 | 12/2007 | Freyer et al. | |
| 2015/0345479 | A1 * | 12/2015 | Mark | F04B 43/0054 74/126 |
| 2016/0059939 | A1 * | 3/2016 | Lamonby | B08B 9/023 114/337 |
| 2016/0256903 | A1 | 9/2016 | Motzo | |

* cited by examiner

CABLE MANAGEMENT APPARATUS AND SYSTEM

This application is the U.S. National Stage of International Application No. PCT/GB2018/051943, filed Jul. 9, 2018, which designates the U.S., published in English, and claims priority under 35 U.S.C. § 119 or 365(c) to Great Britain Application No. 1711002.4, filed Jul. 7, 2017. The entire teachings of the above applications are incorporated herein by reference.

FIELD OF THE INVENTION

The present invention is in the field of sensors and umbilical cables suitable for deployment in a pipe, particularly, but not exclusively, a cable management apparatus having a mechanism for helping to pass an umbilical cable through a pipe, and a sensor or plurality of sensors suitable for deployment in the pipe for determining one or more physical dimensions of the pipe.

BACKGROUND

In the relatively close confines of most plant it is useful to deploy sensors and equipment by the use of cables which are generally called umbilicals. Alternatives to umbilicals exist including the use of autonomous equipment that is deployed and gathers data and is then collected at another location or remote control where the apparatus is communicated with via radio waves or other means. However, in environments which have high amounts of electromagnetic interference, it may not be possible to communicate using such wireless means. Further benefits of cables are high data rates, a permanent power supply to the equipment and the ability to remotely control the apparatus during its deployment.

Pipe works are usually designed for their main purpose of transporting fluids and are not generally designed to facilitate easy inspection by a human operator. As a consequence it is normal for there to be many bends or T pieces that need to be navigated in order to reach an area of critical importance. When the number of bends increases beyond a relatively small number the friction on the cable, from contact with the inner surface of the pipe about a numbers of such bends, reaches a point where the cable cannot be pulled or pushed any further. This situation is undesirable and may prevent many necessary inspections from being carried out.

SUMMARY

The subject-matter described in the following description relates to an apparatus and systems for managing cables, in particular apparatus and systems which enable pipes to be inspected around many more bends through use of a cable.

According to a first aspect of the invention, there is presented a cable management apparatus for deployment within a pipe, where the pipe houses at least a portion of an umbilical cable. The cable management apparatus comprises a first engagement portion for engaging with an interior surface of the pipe, a second engagement portion for engaging with the umbilical cable, a first end and a second end. The cable management apparatus is configured such that, in use, the umbilical cable extends outwardly and away along the pipe, in substantially opposite directions from the first and second ends. The cable management apparatus is further configured to assist the moving of the umbilical cable along a lengthwise portion of the pipe using at least the first engagement portion and/or the second engagement portion. This aspect may be modified in any suitable way disclosed herein, including but not limited to any one or more of the following.

Optionally, at least one of the first and second engagement portions may be configured to secure, in a fixed position, the cable management apparatus with the interior surface of the pipe or the umbilical cable respectively. Furthermore, in such a configuration the cable management apparatus may be configured to secure a portion of the umbilical cable in a fixed position with respect to the pipe by the first and second engagement portions.

In optional embodiments, the cable management apparatus may comprise any one or more of a first driving mechanism for moving the cable management apparatus with respect to the pipe and a second driving mechanism for moving the cable with respect to the cable management apparatus. In such configurations, the cable management apparatus may be configured to actively assist the movement of the umbilical cable by driving the umbilical cable along the lengthwise portion of the pipe using any one or more of:

- the first engagement portion and the second driving mechanism where the first engagement portion is configured to secure in a fixed position the cable management apparatus with respect to the interior surface of the pipe;
- the second engagement portion and the first driving mechanism where the second engagement portion is configured to secure in a fixed position the cable management apparatus with respect to the umbilical cable; and
- the first and second driving mechanisms.

Optionally, the second engagement portion may comprise any of a rolling bearing mechanism for contacting the cable and/or a low friction surface for contacting the cable. In such an arrangement, the cable management apparatus may be configured to passively assist the movement of the cable by using the second engagement portion of this arrangement and the first engagement portion, where the first engagement portion is configured to secure in a fixed position the cable management apparatus with respect to the interior surface of the pipe.

In optional embodiments, the cable management apparatus may have at least two deployment states. These deployment states may comprise a static deployment state, an active deployment state and a passive deployment state. In such an arrangement, the static deployment state may comprise a state wherein the second engagement portion may be configured to secure, in a fixed position, the umbilical cable with respect to the cable management apparatus, the first engagement portion may be configured to secure, in a fixed position, the cable management apparatus with respect to the pipe, and the cable management apparatus may be configured to secure a portion of the umbilical cable in a fixed position with respect to the pipe by the first and second engagement portions. Additionally, the active deployment state may comprise a state wherein the cable management apparatus may be configured to actively assist the movement of the umbilical cable by driving the umbilical cable along the lengthwise portion of the pipe using any one or more of:

- the first engagement portion and the second driving mechanism where the first engagement portion is configured to secure in a fixed position the cable management apparatus with respect to the interior surface of the pipe;
- the second engagement portion and the first driving mechanism where the second engagement portion is configured to secure in a fixed position the cable management apparatus with respect to the umbilical cable; and the first and second driving mechanisms.

Further additionally, the passive deployment state may comprise a state in which the second engagement portion may comprise any of a rolling bearing mechanism for contacting the cable and/or a low friction surface for contacting the cable. In such an arrangement, the cable management apparatus may be configured to passively assist the movement of the cable by using the second engagement portion of this arrangement and the first engagement portion, where the first engagement portion is configured to secure in a fixed position the cable management apparatus with respect to the interior surface of the pipe.

In such an arrangement where the cable management apparatus has at least two deployment states as described above, the cable management apparatus may be additionally configured to transition between any of the said states upon a signal indicative of a parameter associated with any one or more of a position of the cable management apparatus with respect to the pipe, a state of the umbilical cable or a state of the cable management apparatus. In such an arrangement, the cable management apparatus may comprise one or more sensors for determining any of the parameters described. Further optionally, in these arrangements, the one or more sensors may comprise any one or more of an odometer configured to determine the distance travelled by the cable management apparatus lengthwise along the pipe, an inclinometer configured to determine the inclination of the cable management apparatus with respect to gravity and an accelerometer configured to determine the movement of the cable management apparatus in at least one three-dimensional plane.

Further optionally, where the cable management apparatus comprises at least one deployment state in accordance with the above optional embodiments, the cable management apparatus may be configured to receive a control signal from an external system, the control signal being configured to initiate the transition from one of the said static, active and passive deployment states to another of the said states.

In an optional embodiment, the cable management apparatus may be further provided with a propulsion mechanism for propelling itself along the pipe.

Optionally, where the cable management apparatus is provided with sensors in accordance with any of the optional embodiments described above, the sensors may be additionally configured to determine a physical parameter of the umbilical cable. In such arrangements, the physical parameter may comprise the tension of the umbilical cable. The physical parameter may also comprise the velocity of the umbilical cable.

In a further aspect of the invention, there is provided a system comprising a plurality of cable management apparatus, where the each of the cable management apparatus is in accordance with the aspect described above. This aspect may be adapted according to any feature or configuration as described herein, including but not limited to any one or more of the optional features described in the above aspect.

In a further aspect there is provided a cable management apparatus which is configured for deployment within a pipe which houses an umbilical cable conveyed along at least a portion of its length, the cable management apparatus being suitable for assisting the moving of an umbilical cable along a lengthwise portion of the pipe, the cable management apparatus comprising: a first engagement portion for engaging with an interior surface of the pipe; and, a second engagement portion for engaging with the umbilical cable; wherein a continuous section of the umbilical cable is arranged to extend away from the cable management apparatus in a lengthwise direction along the pipe from both a proximal end and a distal end of the cable management apparatus. This aspect may be adapted according to any feature or configuration as described herein, including but not limited to any one or more of the optional features described in the above aspects.

In a yet further aspect there is provided a pipe dimension mapping apparatus which is configured for deployment within an elongate pipe, and is configured to be suitable for determining physical dimensions of the elongate pipe, the pipe dimension mapping apparatus comprising at least one sensor, wherein the sensor is configured to output one or more sensor signals associated with the length, shape or curvature of the pipe to a processor, the processor is configured to receive these signals and to determine a profile of a portion of the pipe in dependence upon these signals. This aspect may be adapted according to any feature or configuration as described herein, including but not limited to any one or more of the optional features described in the above aspects.

Embodiments of the present invention will now be described in detail with reference to the accompanying drawings, in which:

DETAILED DESCRIPTION

General

There is presented a cable management apparatus 10 which is configured for deployment within a pipe 12 which houses an umbilical cable 14 conveyed along at least a portion of its length, which is suitable for assisting the passing of an umbilical cable 14 along a lengthwise portion of the pipe 12.

Figure 1A:
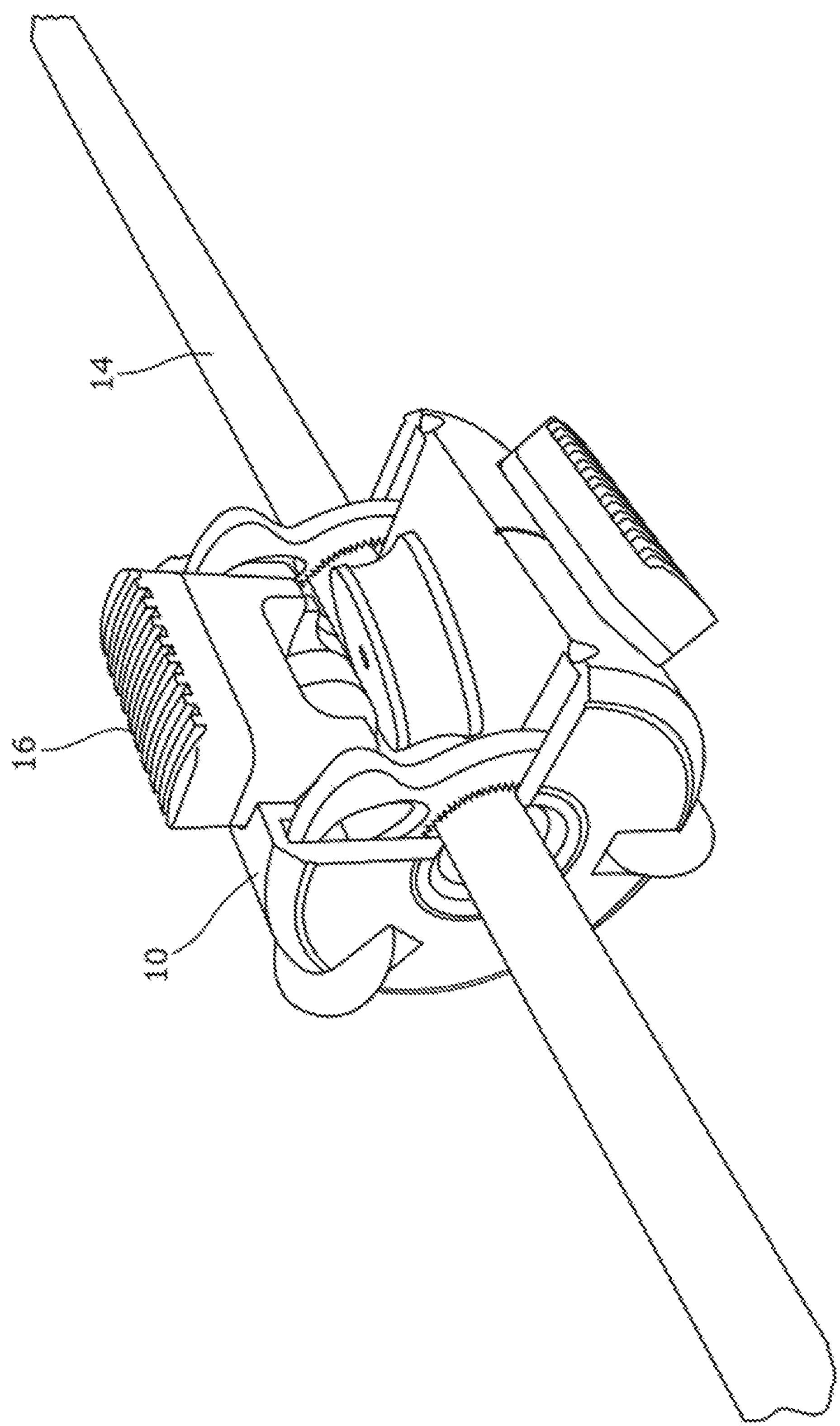
FIG. 1*a* shows an example of a cable management apparatus provided with retractable attachment devices in a deployed position.
Figure 1B:
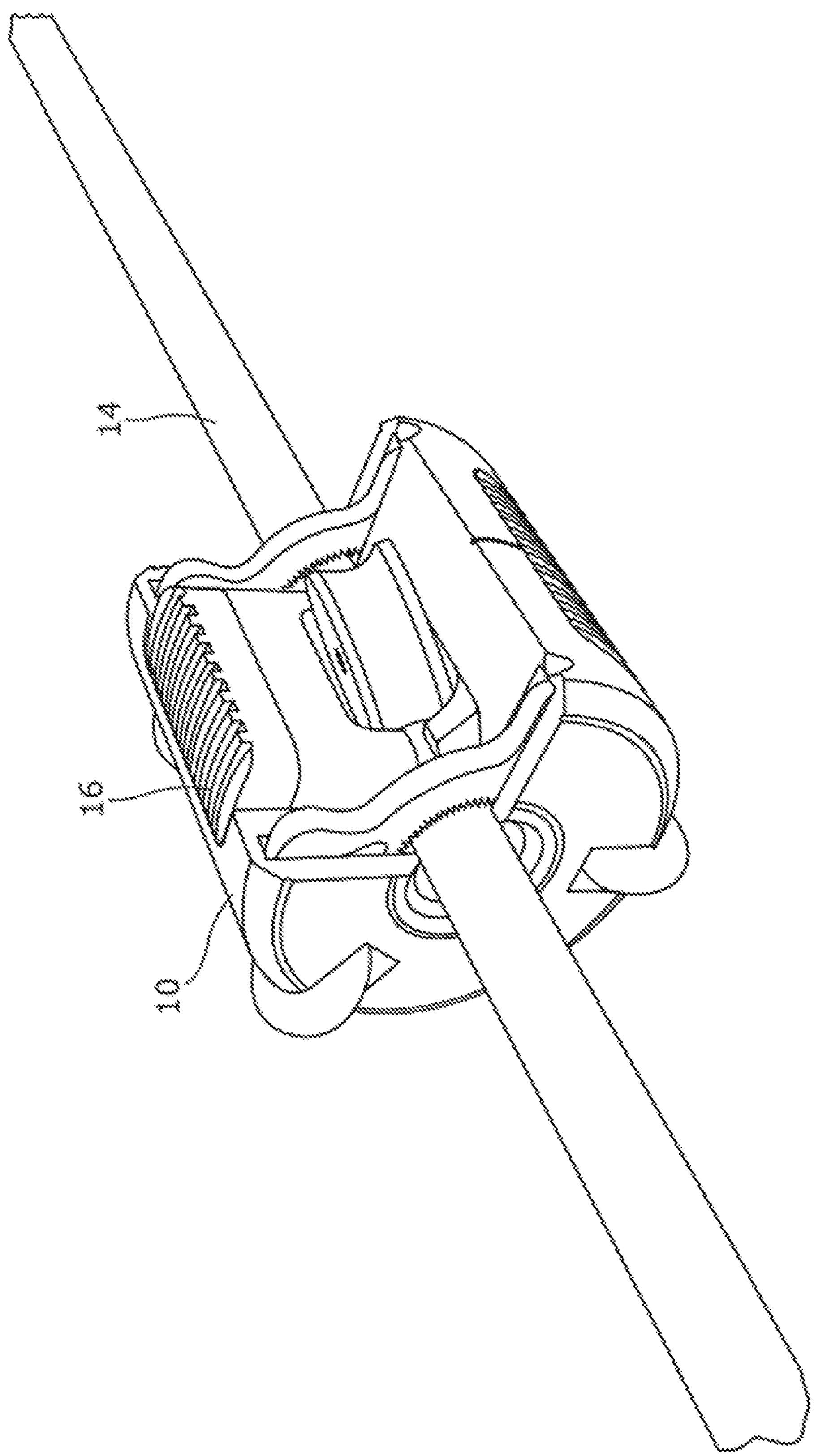
FIG. 1*b* shows an example of the apparatus of FIG. 1*a* where the retractable attachment devices are in a retracted position.
Figure 1C:
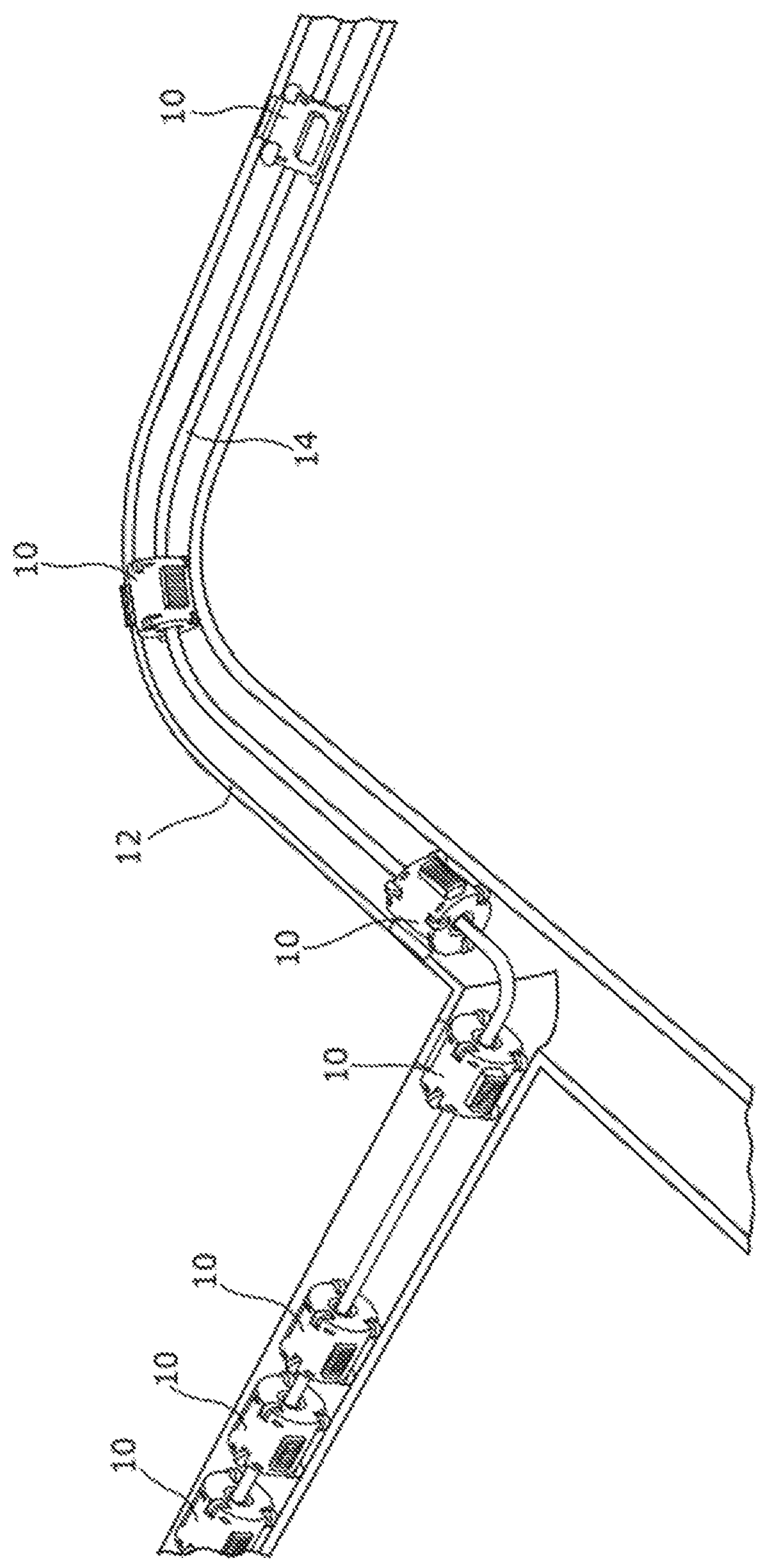
FIG. 1*c* shows an example use scenario where several of the apparatus of FIG. 1*a* are deployed in a pipe.
Figure 1D:
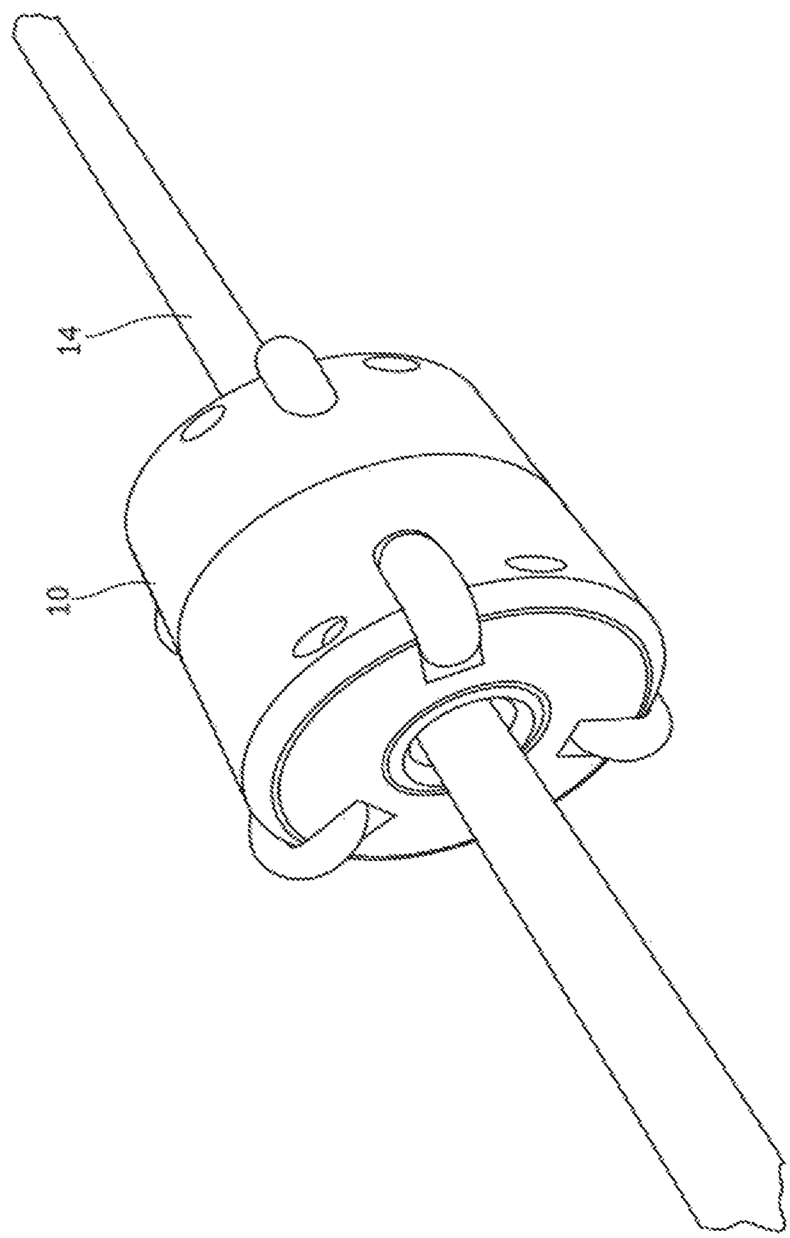
FIG. 1*d* shows an example of a cable management apparatus when not provided with retractable attachment devices.
Figure 1E:
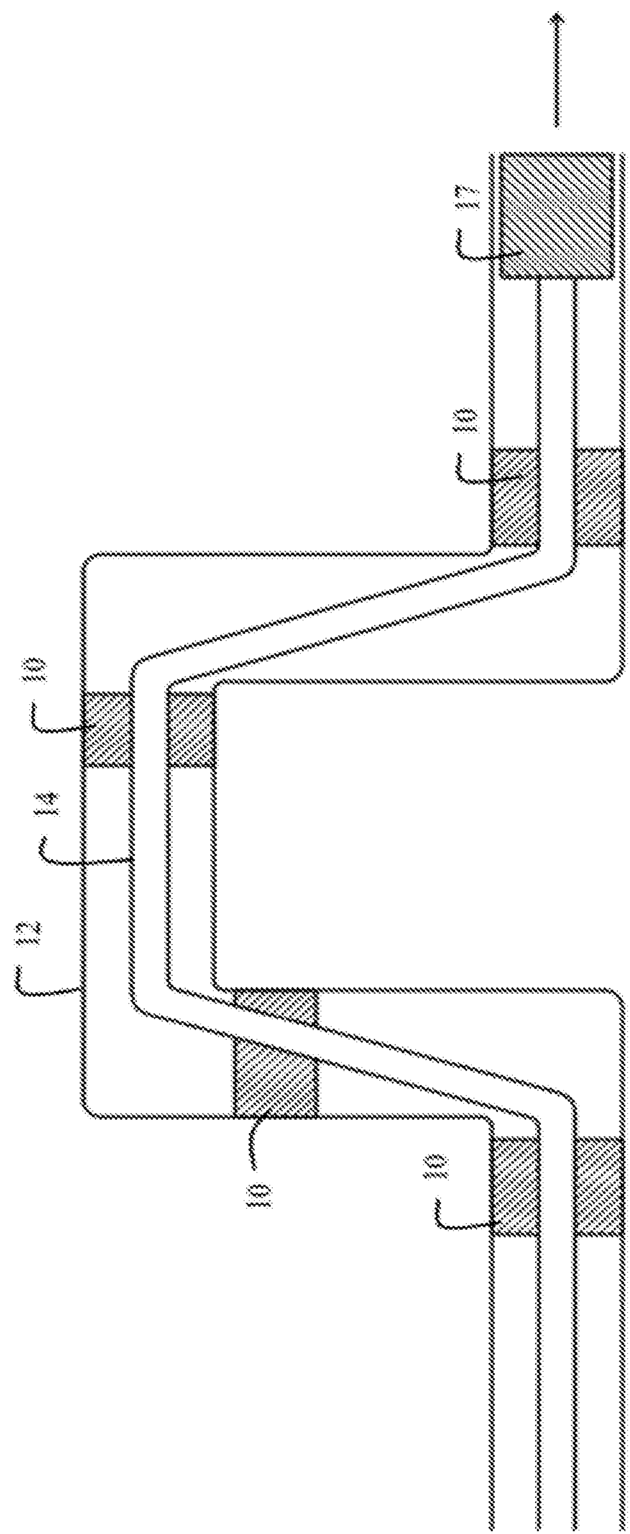
FIG. 1*e* shows an example use scenario where several of the apparatus of FIG. 1*a* or 1*d* are deployed in a pipe and where the umbilical cable is enabling a resource consumption apparatus to be deployed.

An example embodiment of such an apparatus can be seen in FIGS. 1*a*-1*b*, where FIG. 1*a* shows the apparatus in use with an umbilical cable 14 passing through the interior of the apparatus 10 and additionally provided with retractable attachment devices 16 for attaching the apparatus 10 to the interior of the pipe 12. FIG. 1*c* shows an example use scenario where several pieces of apparatus 10 are provided along multiple sections of the pipe 12. A second example embodiment of the apparatus can be seen in FIG. 1*d*, where the apparatus is not provided with the retractable attachment devices 16 illustrated in FIGS. 1*a* and 1*b*. FIG. 1*e* shows an example scenario suitable for use with the apparatus 10 of FIG. 1*a* or 1*d*, where a plurality of the pieces of the apparatus 10 are deployed along a pipe 12 and where the umbilical cable 14 is actively following a resource consumption or data producing apparatus 17 through the pipe 12. The umbilical cable 14 may be used to transport electrical and/or optical signals from the data producing apparatus 17 to an end terminal such as a computer. Data producing apparatus 17 may include devices such as cameras and other image recording devices, sensors or other equipment. In some examples the data producing apparatus 17 may have its own power source and therefore may not need to be powered via the umbilical cable 14.

The cable management apparatus 10 may be adapted according to any feature or configuration described herein.

The cable management apparatus 10 comprises a first engagement portion for engaging with an interior surface of the pipe 12 and a second engagement portion for engaging with the umbilical cable 14.

The cable management apparatus may comprise a first end and a second end. The cable management apparatus may be configured such that, in use, the umbilical cable 14 extends outwardly and away along the pipe, in substantially opposite directions from the first and second ends. The cable management apparatus may be further configured to assist the moving of the umbilical cable along a lengthwise portion of the pipe using at least the first engagement portion and/or the second engagement portion.

The apparatus may be arranged in such a way wherein a continuous section of the cable is arranged to extend away from the apparatus 10 in a lengthwise direction along the pipe 12 both from a proximal end and a distal end of the cable management apparatus 10 (wherein the above mentioned first and second ends may relate to the proximal and distal ends). In other words, the cable 14 extends through and/or over the cable management apparatus 10 in a direction along the length of the pipe 12 in which the apparatus 10 is positioned.

The arrangement of this apparatus 10 as described above with the provision of a first and second engagement mechanisms for engaging with an interior surface of the pipe 12 and the cable respectively helps to prevent the umbilical cable 14 from becoming immovable within the pipe 12 which would subsequently prevent the forward progression along the pipe 12 of a resource consuming apparatus 17 which is coupled to the leading end of the umbilical cable 14. The resource consuming apparatus 17 could be any apparatus connected to the end of the umbilical, including, but not limited to an umbilical pipe crawler for inspecting the pipe 12. The term 'crawler' is used herein to describe examples of how the cable management apparatus 10 can be used, however, for these examples, it is understood that other resource consuming apparatus 17 may be used instead or in addition to a crawler.

At least one of the first and second engagement portions may be configured to secure, in a fixed position, the cable management apparatus 10 with the interior surface of the pipe 12 or the umbilical cable respectively. Through use of both of the first and second engagement portions being used to secure the cable management apparatus 10 to the interior surface of the pipe 12 and the umbilical cable respectively, the cable management apparatus 10 may be configured to secure a portion of the umbilical cable 12 in a fixed position with respect to the interior surface of the pipe 12. This may define a static deployment state.

Typically an umbilical cable 14 will be pulled along the inside of the pipe 12 by a resource consuming apparatus 17 for which it is providing a resource (for example, electricity). As the umbilical cable 14 is pulled along, it is likely to be required to traverse around corners and junctions. When this occurs, the umbilical cable 14 is likely to make contact with the interior surface of the pipe 12 and as such encounter a resistant frictional force at these contact points. The changing direction also increases tension within the cable which resists further movement of the umbilical cable 14. Eventually a critical point will be reached where the resistant forces described prevent any further movement of the umbilical cable 14 and consequently any further progression of the resource consuming apparatus 17. This apparatus 10 is able to either reduce or remove these forces by the use of the functionality of the two engagement portions. For example, the cable management apparatus 10 could lock itself in a position about a pipe bend and allow the cable to be spaced from the interior pipe wall and, instead, pass through the apparatus 10 wherein low friction surfaces or bearings are used to feed the cable through the cable management apparatus 10. In another example the cable management apparatus 10 could grip the cable 14, in an area local to a bend and then self-propel itself along the pipe 12, taking the cable with it.

There is further presented a pipe dimension mapping apparatus which is configured for deployment within an elongate pipe 12. The pipe dimension mapping apparatus is configured to be suitable for determining the physical dimensions of the elongate pipe 12. These dimensions may include the length and shape of the elongate pipe 12 and the direction in which a portion of the elongate pipe 12 extends relative to other portions of the elongate pipe 12. The pipe dimension mapping apparatus comprises at least one sensor.

The sensor is configured to output one or more sensor signals associated with the length, shape or curvature of the pipe 12 to a processor. The processor is configured to receive these signals and to determine a profile of a portion of the pipe 12 in dependence upon these signals.

Example of Operation

Figure 2:
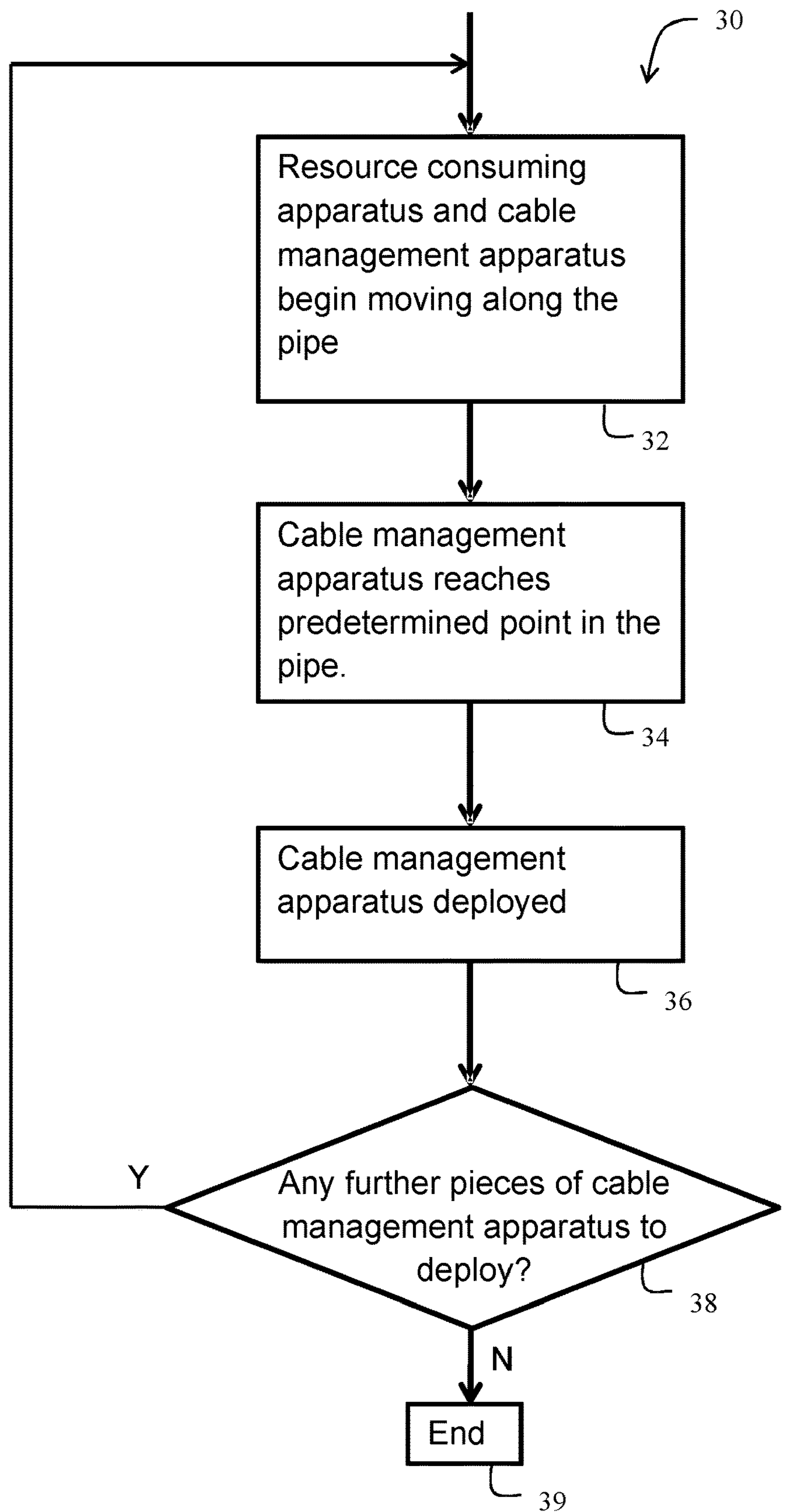
FIG. 2 shows an example of steps undertaken in passing an umbilical cable along a lengthwise portion of the pipe using an embodiment of a cable management apparatus described herein, such as but not limited to the apparatus of FIG. 1*a* or FIG. 1*d;*

FIG. 2 shows a block diagram describing an example of an operative procedure 30 for the cable management apparatus 10 described herein which allows for the passing of an umbilical cable 14 along a lengthwise portion of the pipe 12. At Step 32, the aforementioned resource consuming apparatus begins moving along the pipe 12 and pulls the trailing umbilical cable 14 along with it. In one embodiment of the cable management apparatus 10, at least one such cable management apparatus 10 will be arranged and coupled along the umbilical cable 14 and may be configured to be pulled through the pipe 12 with the umbilical cable 14. In such a configuration, the cable management apparatus 10 may be configured to not engage with an interior surface of the pipe 12. A plurality of pieces of cable management apparatus 10 may be deployed. The pieces of cable management apparatus 10 of the plurality may be of the same type (i.e. same types of components and engagement configurations) or different types. For purposes of this description, reference to 'pieces' of cable management apparatus 10 means separate cable management apparatus 10 of a possible plurality of cable management apparatus 10.

The resource consuming apparatus, umbilical cable 14 and cable management apparatus 10 arrangement may continue to travel along the pipe 12 until the arrangement determines, at Step 34, that the cable management apparatus 10 has reached a predetermined point in the pipe 12. The point may be predetermined by being determined at any time before the cable management apparatus 10 is deployed, for example, being determined before the crawler enters the pipe 12, being determined as the crawler progresses along the pipe 12. The predetermined point may be defined, for example, by its distance along the pipe 12. Such a point may also be defined as being a point where the degree of curvature of the pipe 12 is greater than or equal to a certain value. Once the arrangement has reached a predetermined point, the cable management apparatus 10 is deployed, at Step 36, at this predetermined point in the pipe 12. The deployed state of the cable management apparatus 10 may comprise any suitable arrangement such that it is suitable to achieve its functionality of assisting the passing of the umbilical cable 14 along a lengthwise portion of the pipe 12. This may comprise either a passive or an active configuration. A passive configuration may comprise the cable management apparatus 10 being deployed in the pipe 12 as described above, with no active action being taken by the cable management apparatus 10. An active configuration may comprise the cable management apparatus 10 actively driving a continuous section of the umbilical cable 14 in order to assist the passing of the umbilical cable 14 along the pipe 12. Such an active configuration may be enabled by the provision of any one or more of a first driving mechanism for moving the cable management apparatus 10 with respect to the pipe and/or a second driving mechanism for moving the cable with respect to the cable management apparatus 10. This may comprise, for example, the provision of motorised rollers on a portion of the cable management apparatus 10. The passing of the cable along the pipe 12 could be achieved in a number of ways including, but not limited to: the cable management apparatus 10 moving along the pipe 12 whilst gripping the cable, the cable management apparatus 10 staying stationary in its deployed position and urging the cable along the pipe 12; the cable management apparatus 10 moving along the pipe 12 whilst also urging the cable along the pipe 12.

Following this step, it is then determined, at Step 38, whether there are any further pieces of cable management apparatus 10 left to deploy. If there are, the procedure then returns to Step 32 and the resource consuming apparatus, umbilical cable 14 and any further pieces of cable management apparatus 10 may continue to travel along the pipe 12 until the crawler or further cable management reach another predetermined point, as described at Step 34. If there are no further pieces of cable management apparatus 10 to deploy, the procedure ends at Step 39.

Figure 3:
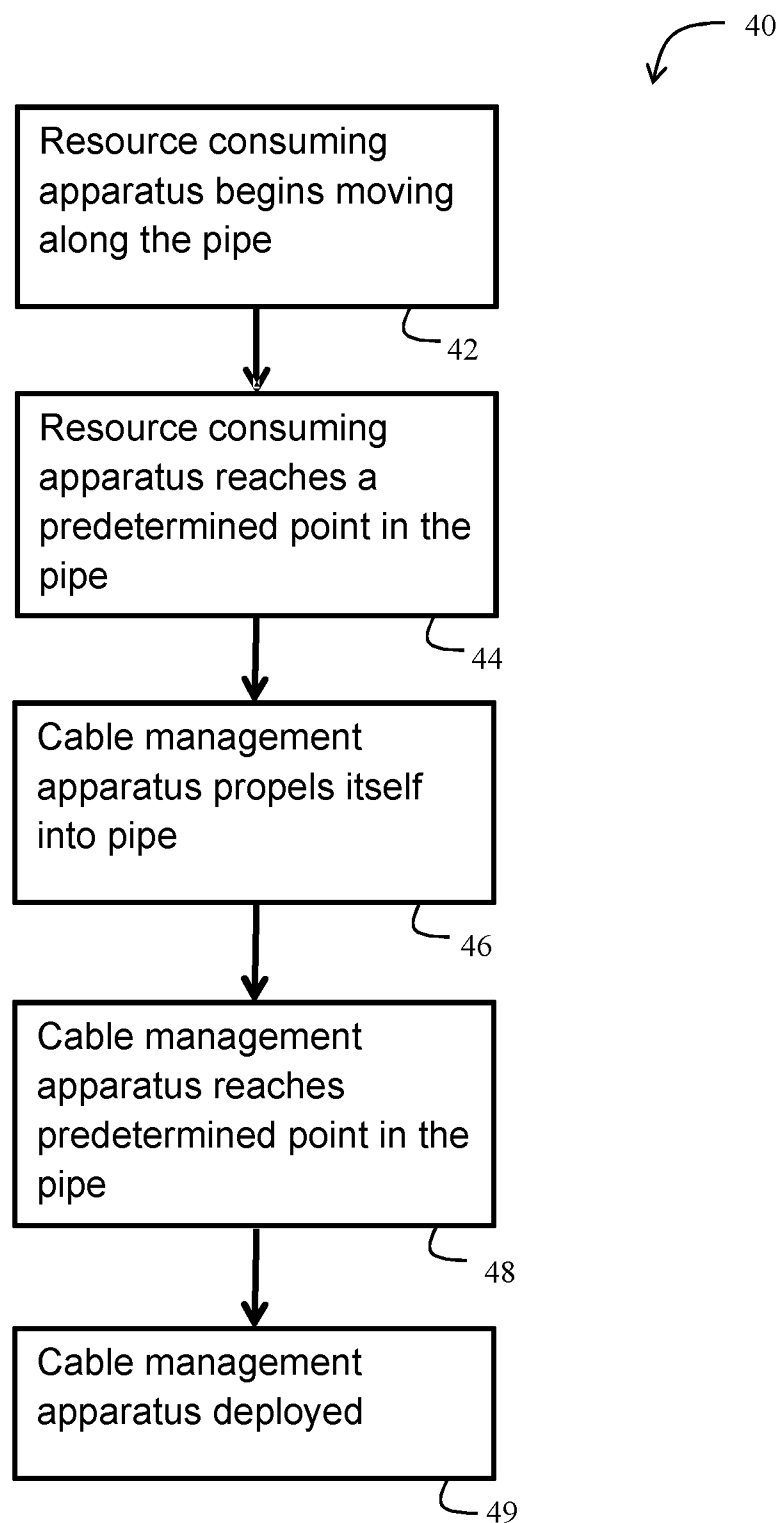
FIG. 3 shows an example of the steps undertaken in propelling an embodiment of the apparatus of FIG. 1*a* or FIG. 1*d* to a suitable deployment position.

Turning now to FIG. 3, this shows a block diagram describing an alternate operative procedure 40 where the cable management apparatus 10 is configured to propel itself to a position in the pipe 12 where it is to be deployed. In this embodiment, the resource consuming apparatus first begins moving along the pipe 12 at Step 42 and pulls the trailing umbilical cable 14 along with it. This will continue until the resource consuming apparatus reaches, at Step 44, a predetermined point along the pipe 12. As with the procedure of FIG. 2, this may be defined, for example, by its distance along the pipe 12 or by the degree of curvature of the pipe 12 being at that point greater than or equal to a certain value. Furthermore, this point may be defined to have been reached when the resource consuming apparatus is unable to proceed any further. This inability to move may be caused, for example, by the resistance to movement caused by the umbilical cable 14 as discussed previously.

Once the resource consuming apparatus has reached this point, the cable management apparatus 10 may be configured to propel itself into the pipe 12 at Step 46. The self-propulsion of the cable management apparatus 10 may be achieved by any suitable propulsion method or mechanism, for example, by use of motorised wheels which adhere to an interior surface of the pipe 12. The cable management apparatus 10 may then be configured to propel itself, at Step 48, to a predetermined point in the pipe 12. This point may be defined as previously described. This point is not necessarily the same predetermined point referred to in Step 44. Once the cable management apparatus 10 has reached the predetermined point, it is then configured, at Step 49, to enter a deployed state as previously described.

Passive Configuration

Figure 4:
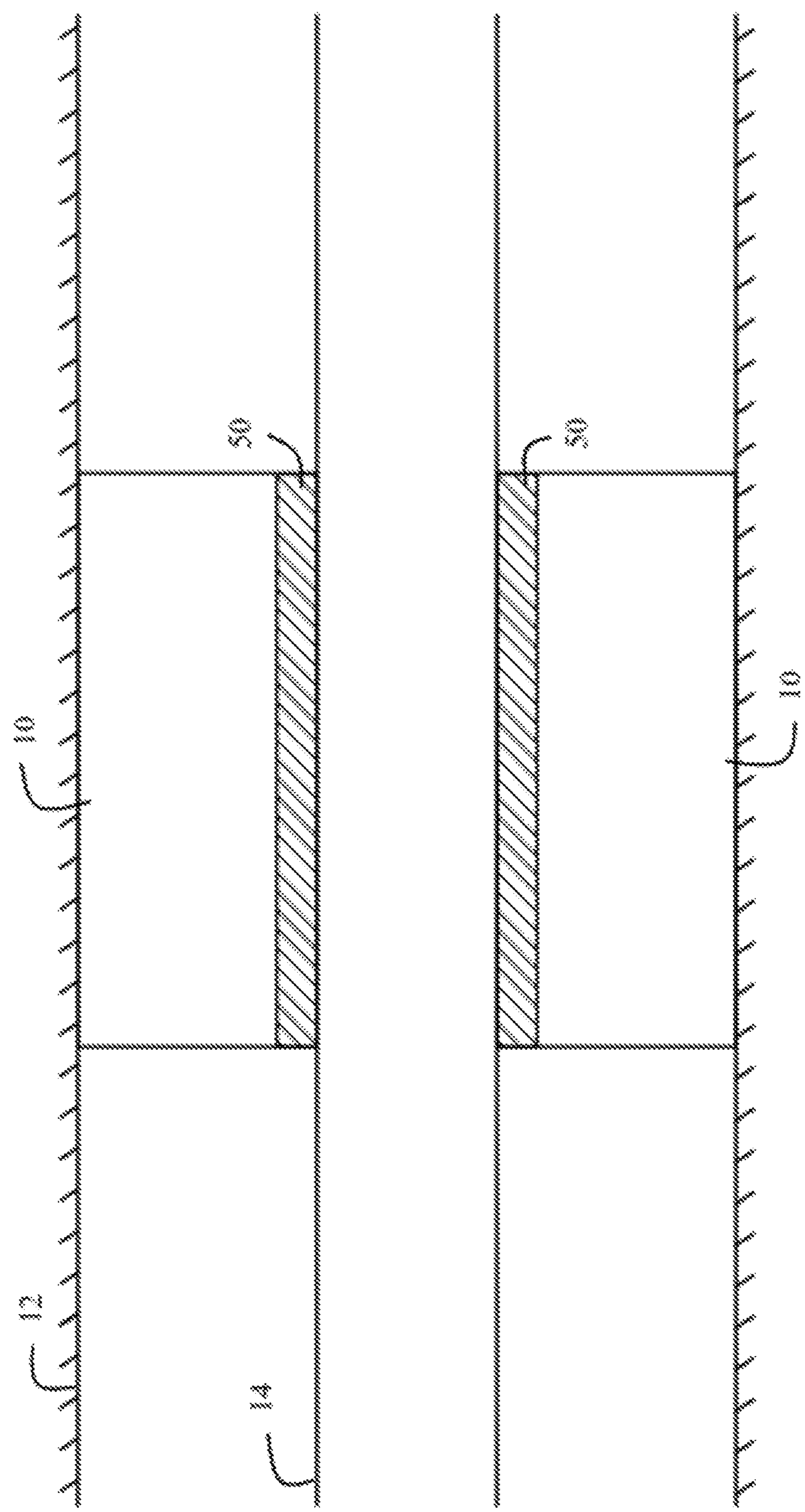
FIG. 4 shows an example of the apparatus of FIG. 1*a* or 1*c* where the apparatus is arranged in a passive configuration.

The described cable management apparatus 10 described herein may be configured to assist the passing of an umbilical cable 14 along a lengthwise portion of the pipe 12 with no active action being taken by the apparatus once it has been deployed (a passive deployment state). An example of this apparatus is illustrated in FIG. 4. This may be achieved by providing a second engagement portion between the cable management apparatus 10 and the umbilical cable 14 which is low friction 50. Additionally or alternatively, the second engagement portion may be provided with a lubricant. Additionally or alternatively, the second engagement portion may comprise a set of unmotorised rollers or rolling bearing mechanism which allow the umbilical cable 14 to pass through the cable management apparatus 10 with minimal or substantially no resistance. In any of the above examples, the frictional force experienced by the umbilical cable 14 is lower than would be experienced than if the umbilical cable 14 were to contact an interior surface of the pipe 12. Such passive assistance may be enabled by using a second engagement portion in accordance with the above description, in conjunction with the use of the first engagement portion to secure the cable management apparatus 10 with the interior surface of the pipe 12, where suitable apparatus for achieving this is described elsewhere in this description.

Active Configuration

The cable management apparatus 10 may be configured to assist the passing of an umbilical cable 14 along a lengthwise portion of the pipe 12 by actively driving the umbilical cable 14 along the pipe 12 (an active deployment state).

In one such embodiment, as shown in FIG. 1*a*, this active driving of the umbilical cable 14 is enabled by the provision of one or more motorised rollers on the second engagement portion of the cable management apparatus 10. This portion may be arranged on, about or within the cable management apparatus 10. This may be an exterior surface of the cable management apparatus 10. Alternatively this may be an indented portion of the cable management apparatus 10. In such an embodiment, the motorised rollers may be configured to ensure that the umbilical cable 14 does not slip relative to the cable management apparatus 10. This configuration may be achieved for example by the inclusion of motorised rollers which have a high friction surface. This may also be achieved by providing at least two motorised rollers in an opposing arrangement, such that the umbilical cable 14 is securely gripped between the at least two rollers. The gripping of the umbilical cable 14 by the at least two motorised rollers may be achieved by the provision of a retraction and deployment mechanism. Alternatively, there may also be provided one or more rollers which may be allowed to freewheel. In this case, the gripping of the umbilical cable 14 may be achieved by both enabling and preventing the freewheeling aspect of the rollers. When the cable management apparatus 10 is in an undeployed state, the motorised rollers may be configured to lie in a retracted state such that there is little to no contact between the rollers and the umbilical cable 14. When the cable management apparatus 10 is subsequently brought into a deployed state, the deployment mechanism will activate such that the motorised rollers are brought into contact with the umbilical cable 14.

Once the motorised rollers are brought into contact with the umbilical cable 14, they may be configured to activate upon receipt of a suitable signal. This signal may be provided by an external source. In this embodiment, the cable management apparatus 10 may be provided with a suitable receiver configured to receive such a signal and a suitable set of electronic components such which enable the received signal to output a further control signal to the motorised rollers instructing them to activate. Alternatively or additionally, the cable management apparatus 10 may be provided with a suitable set of one or more of sensors to determine a physical parameter of the umbilical cable 14. The parameter may for example comprise the degree of tension in the umbilical cable 12. In this case, the cable management apparatus 10 may be provided with a suitable set of one or more of sensors which can determine when the umbilical cable 14 is experiencing a predetermined degree of tension and activate the rollers when this tension is reached. Alternatively, the rollers may be activated when the tension is less than or equal to a threshold level of tension i.e. when the cable has become slack. Also the rollers may be activated when forces are pushing the umbilical cable 14 towards the cable management apparatus 10. In one example, if the cable management apparatus 10 detects that the cable 14 is being pushed towards it, a sympathetic movement in the same direction is undergone by the apparatus 10. This may work similarly if the apparatus 10 detects it is being pulled. The cable management apparatus 10 may also be configured to detect the need to move, for example, detecting a tug or shock sent longitudinally along the umbilical cable 14 using an accelerometer.

The sensors may also be configured to monitor the velocity at which the umbilical cable 14 is passing through the pipe 12 and to determine when this velocity is at such a level that the motorised rollers should activate. In any of these embodiments, the cable management apparatus 10 may be provided with a suitable set of electronic components which enable the apparatus to output a control signal to the motorised rollers upon the sensors sensing that a predetermined state has been reached.

Upon receipt of an activation control signal, the motorised rollers may be configured to begin rotating. The direction of rotation may be is dependent on the required direction of travel of the umbilical cable 14. The motorised rollers contact and grip the umbilical cable 14 and upon rotation, actively drive the umbilical cable 14 through the pipe 12.

Figure 5:
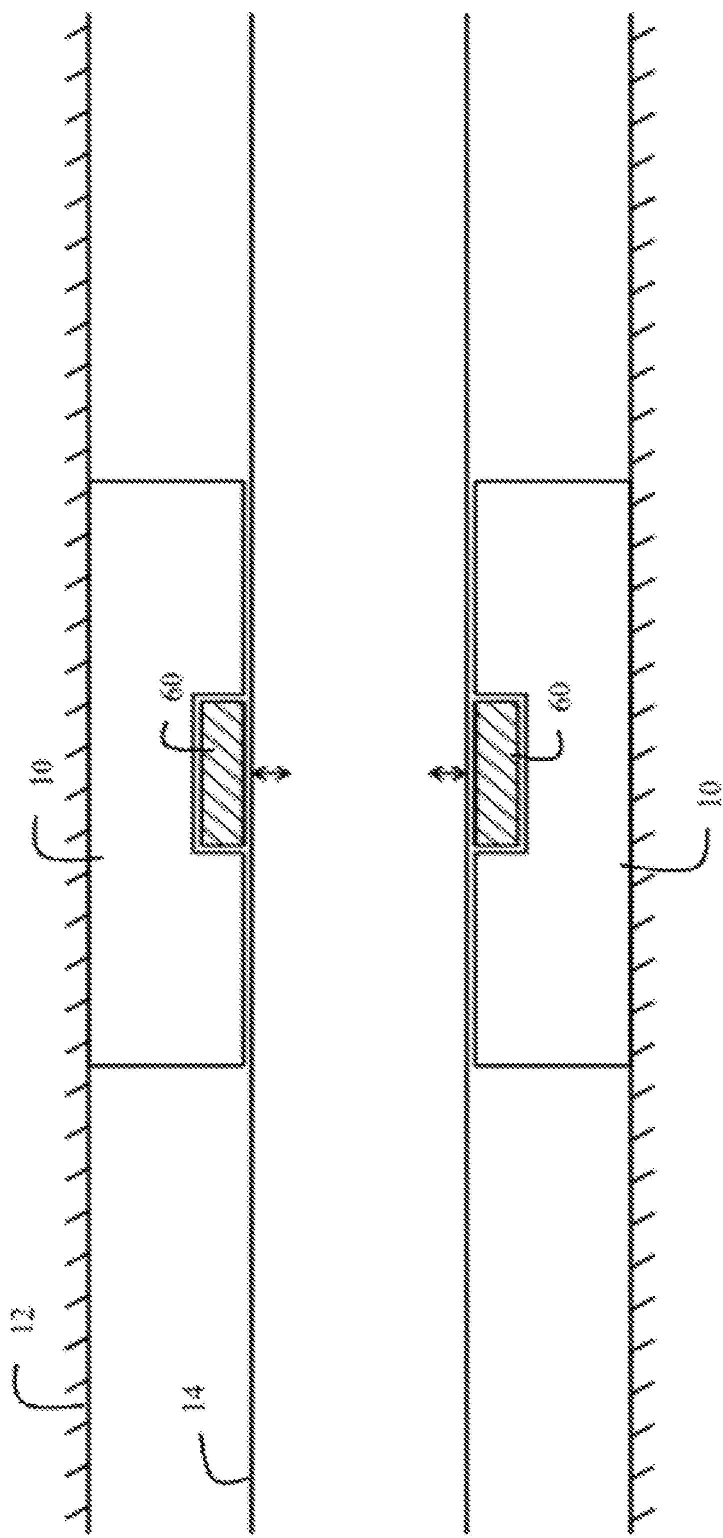
FIG. 5 shows an example of the apparatus of FIG. 1*a* or 1*c* where the apparatus is provided with a clamping mechanism to grip the umbilical cable.

In a further embodiment, as shown in FIG. 5, the active driving of the umbilical cable 14 is achieved by the cable management apparatus 10 gripping the umbilical cable 14 and actively moving itself relative to the pipe 12.

In one configuration of such an embodiment, the second engagement portion may comprise a secure gripping mechanism 60 which further comprises a deployed and retracted state. Such a gripping mechanism 60 may comprise any suitable equipment which enables the cable management apparatus 10 to securely attach itself to the umbilical cable 14 such that any movement by the umbilical cable 14 or the cable management apparatus 10 compels a corresponding movement in the other. By way of example, this may comprise a retractable clamp. This clamp may include a magnetic attachment means.

In this embodiment, once the gripping mechanism 60 is in a deployed state, the cable management apparatus 10 may be configured to propel itself along the pipe 12 in the required direction of movement of the umbilical cable 14. The propulsion may be achieved through any suitable propulsion means. By way of example, this may include the provision of motorised wheels as discussed earlier with relation to FIG. 3. In one embodiment, the cable management apparatus 10 may at all times remain in the same position relative to the umbilical cable 14.

Figure 6A:
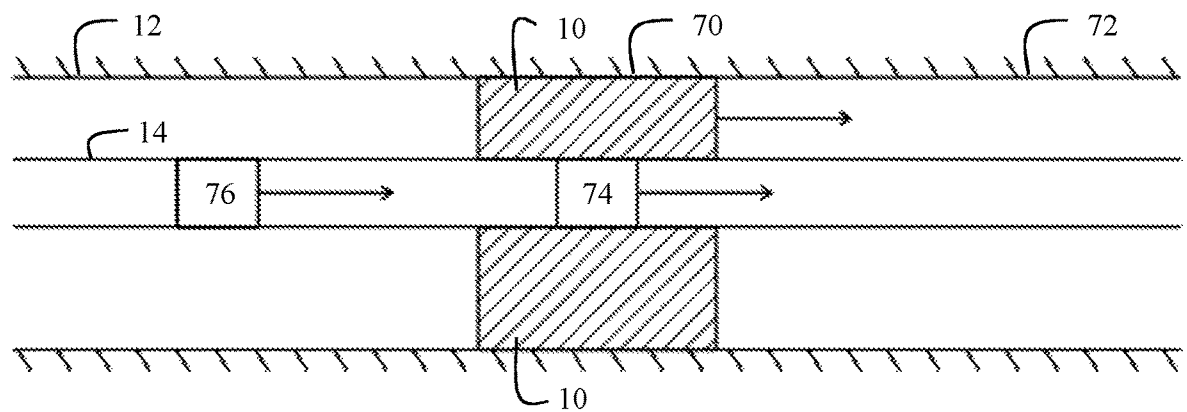
FIG. 6*a* shows an example of the apparatus of FIG. 1*a* or 1*c* where the apparatus is configured to grip a first portion of the umbilical cable at a first portion of the pipe and move it to a second portion of the pipe.
Figure 6B:
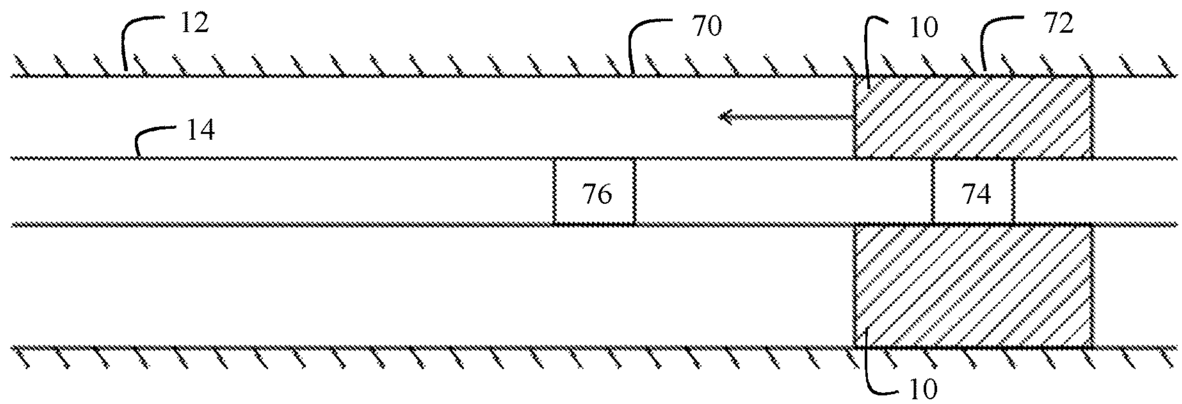
FIG. 6*b* shows an example of the apparatus of FIG. 6*a* where the apparatus is configured to release the cable and return back to the first portion of the pipe.
Figure 6C:
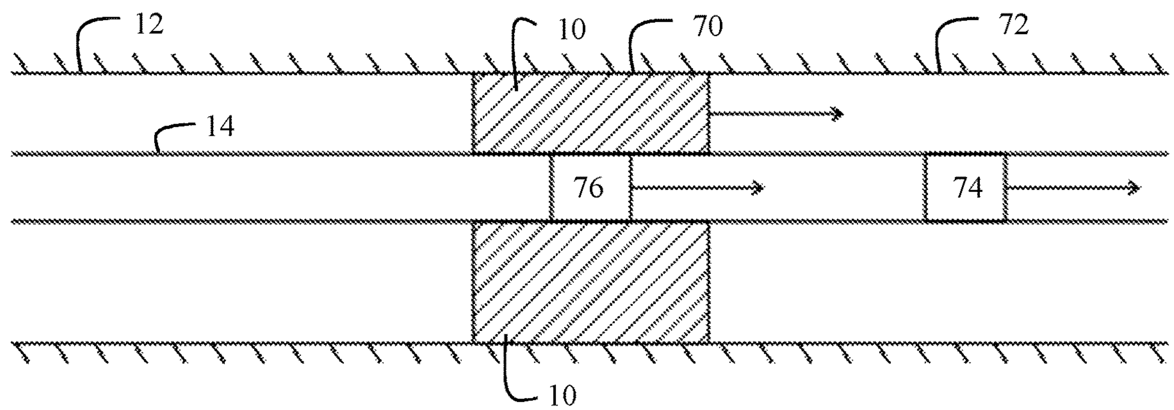
FIG. 6*c* shows an example of the apparatus of FIG. 6*a* where the apparatus is configured to grip a second portion of the umbilical cable at a first portion of the pipe and pass it to a second portion of the pipe.

In an alternative embodiment, the cable management apparatus 10 may be configured to be movable with respect to the umbilical cable 14 and can be configured to move between a first 70 and second 72 point with respect to the pipe 12, before returning back to the first point 70. An example of this embodiment can be seen in FIGS. 6*a*-6*c*. In FIG. 6*a*, the gripping mechanism 60 of the cable management apparatus 10 is deployed such that it grips the umbilical cable 14 at a first point 74 as described above at a first position 70 within the pipe 12. The cable management apparatus 10 may then be configured to propel itself and the first point 74 of the umbilical cable 14 to a second position 76 within the pipe 12, where this new position 72 is shown in FIG. 6*b*. Once the cable management apparatus 10 has reached the second position 72 within the pipe 12, the gripping mechanism 60 may then be configured to retract, such that it is no longer coupled with the umbilical cable 14. Once the gripping mechanism 60 has retracted, the cable management apparatus 10 may then be configured to propel itself back towards the first position 70 within the pipe 12, but as it is no longer coupled to the umbilical cable 14, the position of the umbilical cable 14 remains unchanged. This new arrangement is shown in FIG. 6*c*. In this arrangement, the cable management apparatus 10 has returned to the first position 70 within the pipe 12. The gripping mechanism 60 may then be configured to once again be deployed such that it grips the umbilical cable 14 at a second point 76. The new arrangement may then be configured to propel itself towards the second position 72 in the pipe 12.

System

The cable management apparatus 10 provided may be part of a system of a plurality of such pieces of apparatus, as is illustrated in FIG. 1*b*. Each of these pieces of apparatus may be deployed as discussed above at a plurality of positions along the pipe 12. Each of these pieces of apparatus may also be configured to operate using one or more of the configurations discussed previously. By providing a plurality of such pieces of apparatus, it may be possible to provide a more efficient method of passing the umbilical cable 14 along the pipe 12. This is due to the fact that each of the pieces of apparatus may act to as to reduce or overcome the tension and frictional forces experienced by the umbilical cable 14. With the provision of multiple pieces of apparatus, the reduction in such forces may act in addition, providing a greater overall reduction.

Additionally, in this system, it may be possible for sensing and other relevant information to be transmitted and received between each of the pieces of apparatus 10. The information may be any information generated by one or more pieces of cable management apparatus 10. A cable management apparatus 10 may also be configured to relay information between a remote device and another cable management apparatus 10. These communications may be transmitted according to any means or protocols for example RF, ultrasonic or light. Any one or more of the pieces of cable management apparatus 10 may have a computer readable memory medium comprising instructions to control the cable management apparatus 10. These instructions may be uploaded via the cable 14 and/or be pre-programmed into the memory. This may also allow a first cable management apparatus 10 to transmit a control signal configured to instruct a second cable management apparatus to begin actively passing the cable as described above. In this embodiment, each of the pieces of apparatus may be additionally be provided with one or more of: a receiver, a transmitter and a transceiver such that information may be passed between each apparatus. This may, for example, enable a first apparatus to detect that the velocity of the cable has slowed to below a given threshold and to instruct other deployed pieces of apparatus to being actively passing the cable along the pipe 12, as discussed above.

Control signals may instruct the cable management apparatus 10 to go forward or backward along the pipe, to jog the apparatus 10 forward, to move the apparatus 10 until a threshold tension is reached, to freewheel and to brake. There may be onboard sensors and processing means to actively control the velocity of the cable management apparatus and/or control the amount of force imparted upon the cable by the cable management apparatus 10.

There now follows descriptions of components and configurations of the cable management apparatus 10 and ways in which the cable management apparatus 10 may work. Any of these examples or embodiments may be combined with any of the other examples of a cable management apparatus 10 described herein.

Power Supply

In some embodiments, there may be components of the cable management apparatus 10 which requires electrical power to operate. This may be true where electrical components are provided, such as electrical motors and/or receivers, transmitters or transceivers and described above. This may also be true where the apparatus is configured to propel itself along the pipe 12. Cable management apparatus 10 may be provided with its own power source, such as a battery. In situations where there are a plurality of pieces of apparatus, there may be provided a single power source which is electronically coupled with each of said pieces of apparatus such that each piece is powered by the single source.

Each cable management apparatus 10 may be configured to be powered by the umbilical cable 14 itself, where the umbilical cable 14 is configured such that it provides electricity to the resource consumption apparatus.

First Engagement Portion

The first engagement portion may comprise any suitable components which allow the cable management apparatus 10 to engage with an interior surface of the pipe 12. The engagement may simply comprise any contact between the cable management apparatus 10. The engagement may alternatively comprise sufficient contact to enable the cable management apparatus 10 to remain fixed in the same position relative to the pipe 12 when an external force is exerted upon the cable management apparatus 10. This may be achieved by the use of an adhesive. This may also be achieved by using a suitable clamping mechanism. Further alternatively this may be achieved by the use of high friction surfaces on the interior surface of the pipe 12, the first engagement portion or both.

The first engagement portion may comprise a region of contact between the cable management apparatus 10 which enable the cable management apparatus 10 to use this contact to traverse along a lengthwise portion of the pipe 12. This may be achieved by the use of wheels which are configured to enable traction between the wheel and the pipe 12 at such a region of contact and the traversal may be enabled using any of the methods described above. An example of such an embodiment can be seen in FIG. 1*c*.

The first engagement portion may be configured to have both a deployed and retracted position and similarly configured to move between these positions. The deployed configuration of the first engagement portion may comprise any arrangement which enables the first engagement portion to function in accordance with one or more of the embodiments as described above. Similarly, the retracted configuration may comprise any arrangement where the first engagement portion is unable to perform its function in accordance with one or more of the embodiments as described above.

An example embodiment which illustrates the use of a deployable first engagement portion is shown in FIG. 1*a*. In this embodiment, a plurality of prongs are provided, each of which has a deployed and retracted position. When in a retracted position, the prongs are positioned such that they do not contact an interior surface of the pipe 12. When the prongs are in a deployed position, they are positioned such that they do contact the interior surface of the pipe 12. Furthermore, in the deployed position, the prongs exert a sufficient force upon the interior surface of the pipe 12 such that the cable management apparatus 10 remains fixed in the same position relative to the pipe 12 when an external force is exerted in accordance with an embodiment described above. The prongs (or any other similar component for achieving the same function) may be activated by an actuator such as but not limited to a motor.

A further example embodiment which illustrates the use of a fixed first engagement portion is shown in FIG. 1*c*. In this embodiment, wheels which are configured to enable traction between the wheel and the pipe 12 at a region of contact are arranged along a surface of the cable management apparatus 10, and are configured to enable the cable management apparatus 10 to traverse along a lengthwise portion of the pipe 12 as described above.

Any of the above described embodiments may be combined in order to achieve the benefits of greater functionality.

Deployment

The cable management apparatus 10 may be configured to be deployed upon receipt of a suitable command signal which instructs the apparatus to deploy. Deployment may be enabled when the cable management apparatus 10 is provided with at least two deployment states. These may, for example, comprise any two of the static, active and passive deployment states as described above. Deployment itself may be comprise the cable management apparatus 10 being configured to transition between any two of the deployment states as previously described upon receipt of a signal indicative of a parameter associated with any one or more of a position of the cable management apparatus with respect to the pipe 12, a state of the umbilical cable 14, and/or a state of the cable management apparatus 10. Such a signal may be configured to be sent from an external processor. The signal may be configured to be sent when the cable management apparatus 10 has reached an appropriate deployment position (see description below). In order to determine when this location has been reached, the processor may be configured to monitor sensor data which is recorded by one or more pieces of cable management apparatus 10 in accordance with the description below. In one embodiment, the transmission of the deployment signal is achieved by suitable wireless means. In a further embodiment, the signal may be transmitted through the umbilical cable 14. In these embodiments, the cable management apparatus 10 may be provided with a suitable receiver or transceiver, configured to send a command signal to a deployment mechanism which enables the cable management apparatus 10 to be deployed.

The deployment mechanism may comprise any suitable equipment which enables the cable management apparatus 10 to enter a deployed state as described. This may comprise a mechanism which enables the first engagement portion to engage with the interior of the pipe 12. By way of example, this mechanism may comprise a cam mechanism which is configured to deploy the one or more prongs in accordance with an embodiment described above.

Prior to deployment, the cable management apparatus 10 may be arranged along the umbilical cable 14 and when in an undeployed state, the cable management apparatus 10 may be configured to move synchronously with the umbilical cable 14. Upon receipt of a deployment signal, the cable management apparatus 10 may then be configured to no longer move synchronously with the umbilical cable 14.

In an embodiment where a plurality of cable management apparatus 10 pieces are provided, these may be arranged in series along the umbilical cable 14. Upon receipt of a deployment signal, the cable management apparatus 10 which is arranged furthest from the leading resource consumption apparatus may be configured to deploy. This acts so as to prevent the deployment of the cable management apparatus 10 from hindering further traversal of the pipe 12 by other pieces of cable management apparatus 10.

Deployment Position

Each cable management apparatus 10 may be configured to be deployed at any available position along the pipe 12. This position may be predetermined or may be decided in dependence upon sensor data measuring conditions which are in accordance with a predefined set of parameters. Frequently in systems where such apparatus may be used, the layout of the pipe 12 is known and so it is possible to determine the best position for a piece of apparatus before it enters the pipe 12.

In one embodiment, the pieces of cable management apparatus 10 may be configured to be deployed equidistantly along the pipe 12. The distance between each piece of apparatus may be predetermined by a user of the apparatus. Alternatively, each piece of apparatus may also be configured to be deployed at predefined points along the pipe 12 which are not equidistant.

In a further embodiment, the pieces of cable management apparatus 10 may be configured to be deploy in dependence upon a sensor suite (of one or more sensors) provided on the apparatus determining that the pipe 12 has a curvature at that point of greater than or equal to a certain predefined level. As it is often bends in the pipe 12 which cause resistive tension and frictional forces, it can be most advantageous to deploy cable management apparatus 10 at these particular points. The method of determining the curvature of the pipe 12 at a particular point is discussed below.

The apparatus may be deployed in any one or more of, but not limited to, before and after a shallow bend, after a certain angle is traversed around a bend, after a certain distance between modules, at 'T' pieces and at transitions between two portions of the pipe 12 where the cross section of the pipe 12 changes.

Sensors

In an embodiment, the cable management apparatus 10 may be provided with a suite of one or more sensors which enable the apparatus to determine one or more of its position within the pipe 12, and its orientation relative to the pipe 12 and to gravity. The sensors which may be used are any which enable the cable management apparatus 10 to achieve its desired functionality. For example, any received sensor data may be used to help determine an appropriate position for deployment of the cable management apparatus 10 within the pipe 12.

In one example of the apparatus, the suite of sensors may comprise one or more inclinometers which are able to measure the inclination of the suite of sensors with respect to gravity. The inclinometer may comprise one or more of any known types of inclinometer, including but not limited to those which operate through liquid capacitive means, electrolytic means, a gas bubble in liquid and those that operate through use of a pendulum mechanism.

In another example of the apparatus, the suite of sensors may comprise one or more accelerometers which are able to measure any movement of the suite of sensors. Suitable accelerometers include, but are not limited to, MEMS accelerometers and piezoelectric accelerometers. An advantage of using an MEMS accelerometer is that they are often very small and their small size may allow each of the suites of sensors to be small in size. As the pipe 12 which the cable management apparatus 10 may be small, limiting the size of each sensor enhances the apparatus' ability to operate in such an environment.

The suite of sensors may use one or more accelerometers to measure the movement of the respective sensor suite in one or more three dimensional planes. In this way, it may be possible to determine the relative movement of the associated cable management apparatus 10 in any physical direction. The monitoring of the movement in three dimensions may allow the cable management system to determine its position within the pipe 12. This may be aided by the provision of information regarding the layout of the pipe 12 to the cable management apparatus 10. This information may then further be used to determine an appropriate position for the deployment of the cable management apparatus 10 as discussed above.

In another example of the apparatus, the suite of sensors may comprise one or more odometers which are able to measure the distance travelled by the cable management apparatus 10. In such an embodiment, the cable management device may be provided with wheels which contact an interior surface of the pipe 12 as described in above embodiments. These wheels may be appropriately coupled with the odometer to enable the odometer to achieve its functionality. The monitoring of the distance travelled along the pipe 12 may allow the cable management system to determine its position within the pipe 12. The odometer may also be configured to determine the extent (i.e. the length of umbilical cable 14) to which the umbilical cable 14 has moved through the cable management apparatus 10 This may be aided by the provision of information regarding the layout of the pipe 12 to the cable management apparatus 10. This information may then further be used to determine an appropriate position for the deployment of the cable management apparatus 10 as discussed above.

In a further aspect of the embodiments, the suite of sensors as described above may be used to map the physical dimensions of the pipe 12. These dimensions may include the length and shape of the pipe 12 and the direction in which a portion of the pipe 12 extends relative to other portions of the pipe 12. The sensors which may be used are any which enable the suite of sensors to achieve its functionality as stated above.

In order to achieve this, the suite of sensors may further be provided with one or more of a receiver, a transmitter and a transceiver such that the measured sensor data is able to be transmitted to a suitable central processor. This central processor may be configured such that it can aggregate all received data to determine the physical dimensions of one or more portions of the pipe 12. The central processor may also be configured to receive sensor data from a plurality of sensor suites which may be arranged at a plurality of positions along the pipe 12. The central processor may be additionally coupled directly to one of these sensor suites. Alternatively, the central processor may be housed at a location external to the sensor suite. This location may additionally be external to the pipe 12.

In one embodiment of this aspect, there may be provided a single suite of sensors which is configured to traverse along the pipe 12, where the suite of sensors is configured to make measurements at a plurality of locations along the pipe 12. In this embodiment, the sensor suite may further be provided with a suitable traversal mechanism, for example, by use of a motorised mechanism which enables propulsion along the pipe 12. In a further embodiment of this aspect, there may be provided a system of a plurality of suites of sensors, each of which being positioned at a location in the pipe 12. Each of the sensor suites may be configured to collect sensor data at and around its location in the pipe 12 such that data is received in relation to portions of the pipe 12 or the entire pipe 12. In either of these embodiments, the sensor suites may be configured to transmit the collected sensor data to a central processor, in accordance with the embodiments described above.

It is to be appreciated that the suite of sensors as described above may be configured both to determine a physical parameter of the umbilical cable and to determine a parameter associated with any one or more of a position of the cable management apparatus 10 with respect to the pipe 12, a state of the umbilical cable 14 and/or a state of the cable management apparatus.

In the above described aspect, it is to be understood that this functionality may be achieved in suitable combination with any of the embodiments of the cable management apparatus 10.

Retraction

The above embodiments of the cable management apparatus 10 may further be configured to aid the traversal of the umbilical cable 14 back to an entry point of the pipe 12. This may be configured to occur when using either an active or a passive configuration of the cable management apparatus 10, as described above. In order to achieve this, each cable management apparatus 10 may be configured to move from a deployed state to a retracted state, in accordance with the above description. In this way, the cable management apparatus 10 will not prevent the traversal of the resource consumption apparatus back through the pipe 12.

When the cable management apparatus 10 is arranged in a passive configuration as described above, the second engagement portion which contacts the umbilical cable 14 may be arranged such that the passing of the cable may be equally enabled in each direction of traversal. For example, if the cable management apparatus 10 is provided with a low friction surface there may be no preference of direction of travel of the umbilical cable 14 and as such, the apparatus aids the umbilical cable 14 to traverse in both directions.

When the cable management apparatus 10 is arranged in an active configuration as described above, the active element of the apparatus, e.g. the motorised rollers, may be configured to act in a manner which actively drives the umbilical cable 14 in a direction which is towards the opening of the pipe 12. This may be achieved by the provision of one or more two way motors which drive the motorised rollers.

A cable management apparatus 10 can additionally be retrieved from the pipe 12. This may be enabled by detecting the proximity of the module to the resource consuming apparatus 17 or other umbilical terminal device. It may also be configured to be retrieved upon detection of proximity to another cable management apparatus 10. The retrieval may also be enabled by use of a microswitch provided on the cable management apparatus 10.

Electronic Components and Connectivity

In providing a cable management apparatus 10 as discussed above, it may be necessary to include various electronic components as previously discussed.

Figure 7:
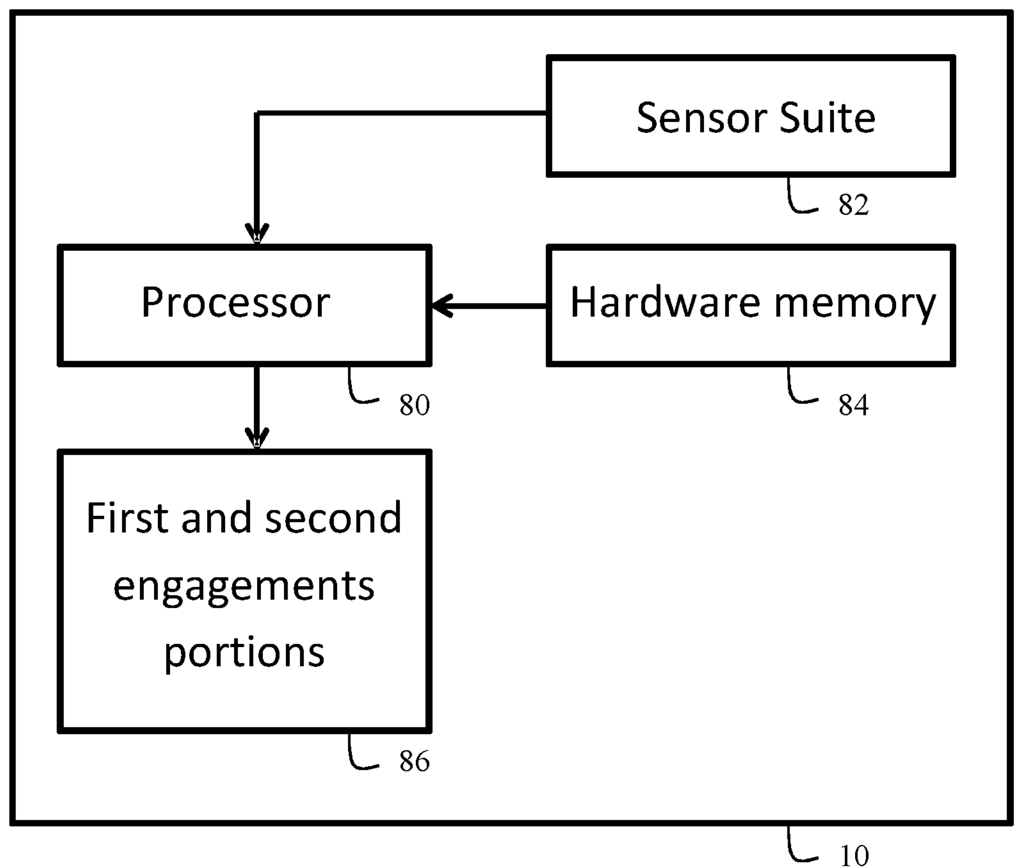
FIG. 7 shows an example of the components included in a cable management apparatus.

FIG. 7 shows an illustrative example of electronic components which may be provided in the cable management apparatus 10 as described herein. In this embodiment, the apparatus 10 is provided with a processor which is configured to receive sensor data from a suite of sensors 82, where this suite of sensors 82 has been previously discussed. In this embodiment, the apparatus 10 may further be provided with a hardware memory device 84. This hardware memory device may be configured to store instructions relating to circumstances in which the first and/or second engagement portions of the apparatus may be configured to engage. Communication between the processor 80, sensor suite 82 and hardware memory device 84 may be enabled via any suitable wired or wireless communication.

The processor 80 may then be configured to process the instructions received from the hardware memory device 84 and the sensor suite 82 to determine if the apparatus 10 is in an environment in which the first and/or second engagement portions 86 should be engaged. If it determines that one or more of the portions should be engaged, the processor 80 may be configured to send a control signal to the relevant portion instructing it to engage. This may equally be applicable when it is determined that the apparatus 10 is no longer in an environment in which one or both of the portions should be engaged. In this instance, the processor 80 may be configured to send a control signal to the relevant portion instructing it to disengage. The control signal may be sent via any suitable wired or wireless communication method.

Figure 8:
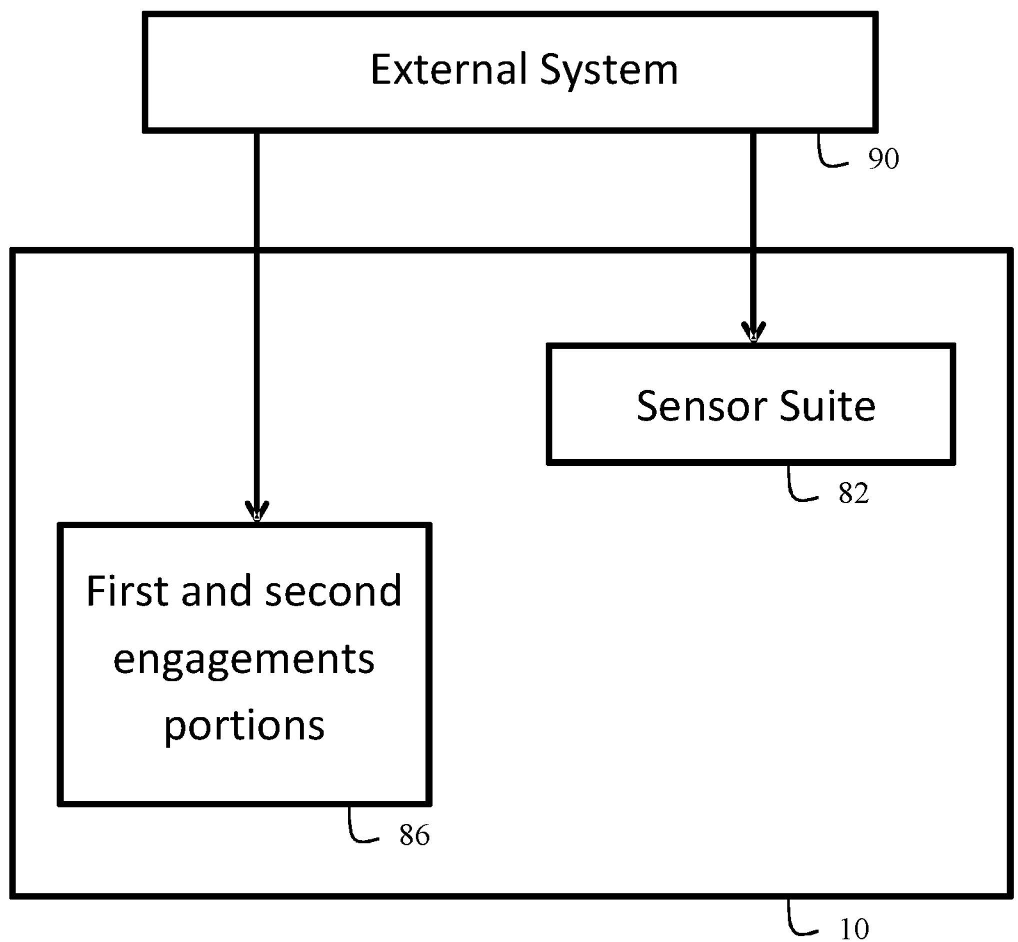
FIG. 8 shows a further example of the components included in a cable management apparatus.

FIG. 8 shows an illustrative example of electronic components which may be provided in the cable management apparatus 10 as described herein. In this embodiment, the apparatus 10 is provided with a suite of sensors 82 which may be used to measure various physical dimensions associated with the pipe in accordance with embodiments described above. The suite of sensors 82 may be configured to send one or more electronic signals to an external system 90 such as a remote computer. These signals may be sent via a wired or wireless means. The wired means may include use of the umbilical cable 14. The external system 90 may be further configured to send one more electronic control signals to the first and second engagement portions 86 and/or the sensor suite 82. These control signals may be used to control the activation of the first and second engagement portions 86. The control signals may also be configured to initiate the transitions from one of the said static, active or passive deployment states to another of the said states. Any of the devices and components of the cable management apparatus 10 may be controlled by signals sent through the umbilical cable 14.

Additionally or alternatively the cable management apparatus 10 may be activated based on signals derived from devices within the apparatus 10.

The cable management apparatus 10 may also be configured to return the clamp to the cable upon power no longer being supplied to the apparatus 10.

Further Examples of Use

Presented below with reference to FIGS. 9-12 are a plurality of example embodiments for the cable management apparatus 10. It is to be understood that these are for illustrative purposes only and that many modifications may be made to these examples and any previously described examples without departing from the scope of the present invention as defined in the accompanying claims.

Various elements of the embodiments may additionally be combined in order to achieve the desired functionality.

Figure 9:
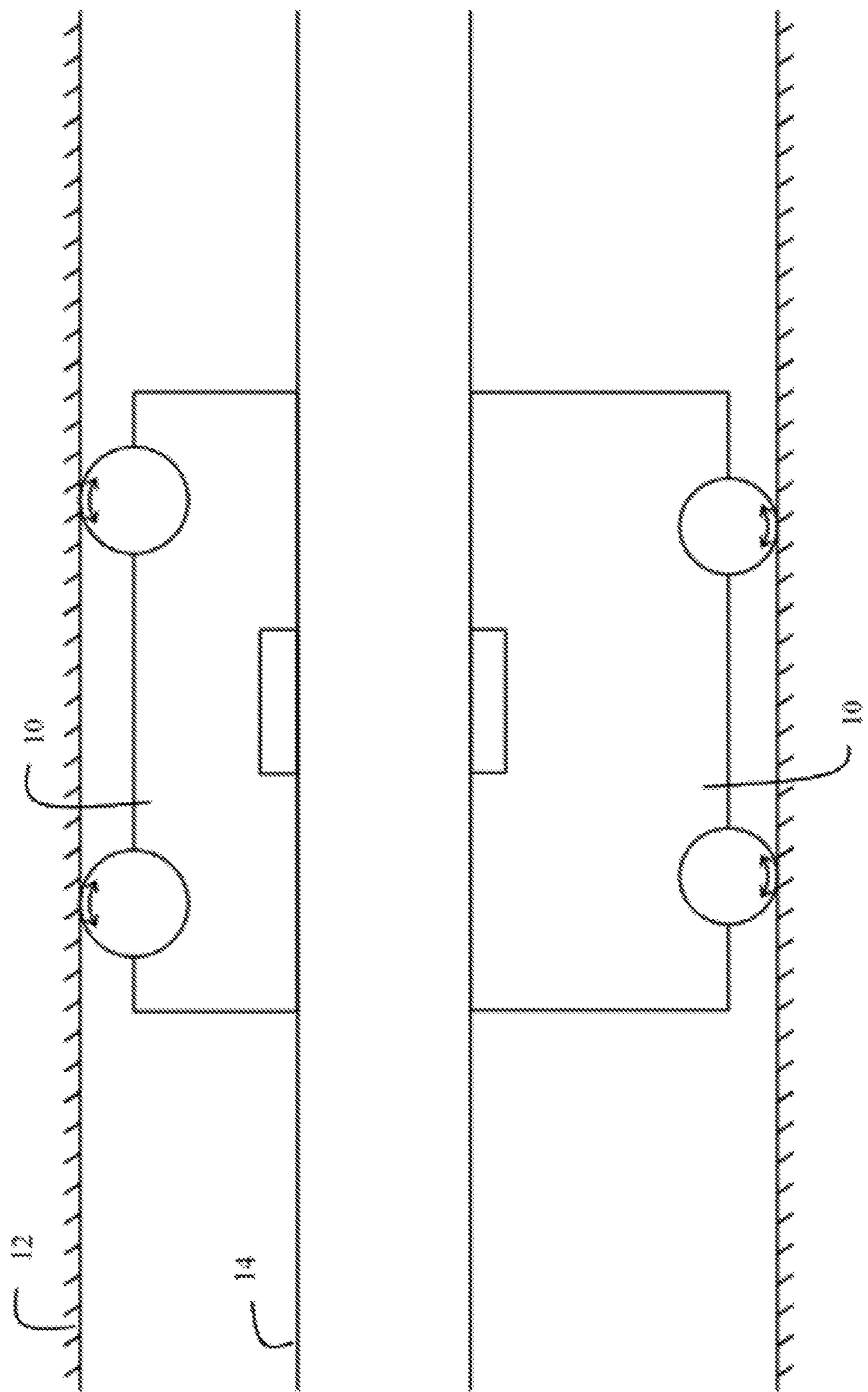
FIG. 9 shows a further example of a cable management apparatus.

FIG. 9 shows an example of the cable management apparatus 10 where one or more motorised wheels are disposed along a surface of the apparatus 10 which contact an interior surface of the pipe 12 which enable the apparatus 10 to traverse along a lengthwise portion of the pipe. In this illustrative example, an attachment mechanism is also provided configured to grip the umbilical cable 14 in order to enable it to be passed along a lengthwise portion of the pipe 12. This attachment may be permanent or temporary.

Figure 10:
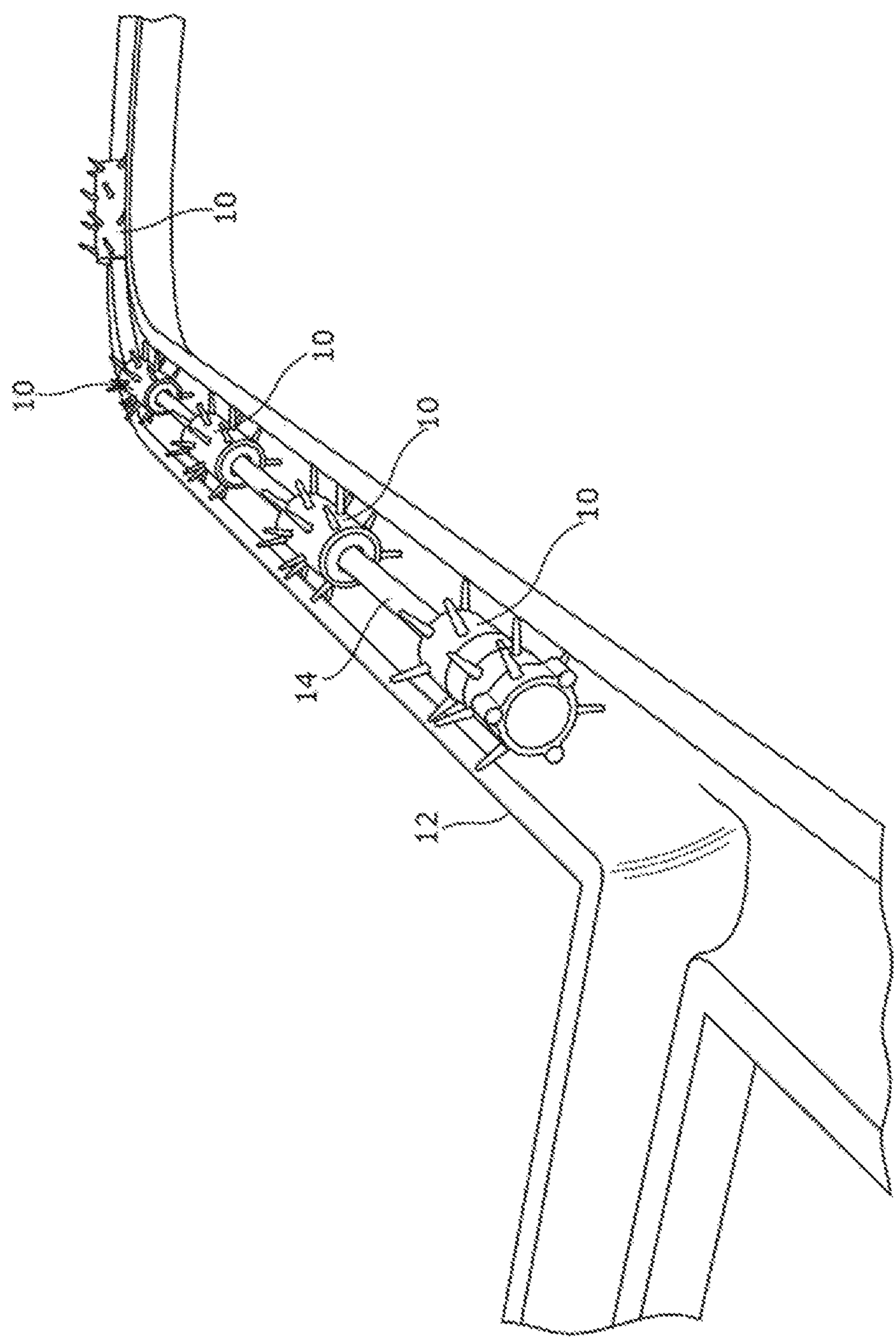
FIG. 10 shows a further example of a cable management apparatus.

FIG. 10 shows an example of a plurality of pieces of cable management apparatus 10 where each apparatus 10 is provided with one more "feelers" which contact the interior surface of the pipe 12. Each feeler is configured to enable movement of the apparatus 10 along a lengthwise portion of the pipe 12 upon the apparatus 10 being subjected to a vibratory or oscillatory movement. In this embodiment, the apparatus may be further provided with an oscillatory or vibrating device (not shown) to enable the apparatus 10 to undergo such a movement.

Figure 11:
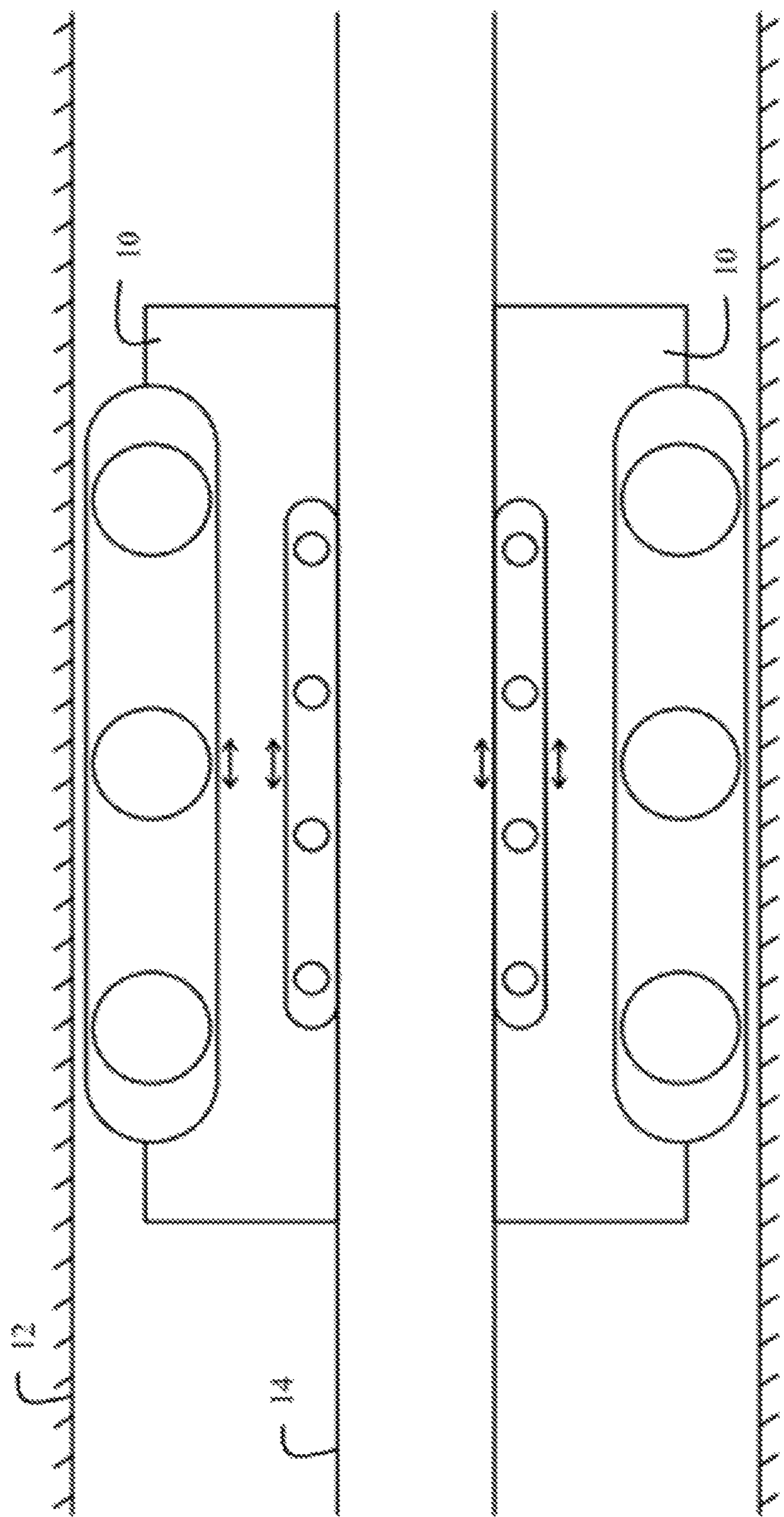
FIG. 11 shows a further example of a cable management apparatus.

FIG. 11 shows an example of the cable management apparatus 10 where the apparatus 10 is provided with one or more motorised tracks (e.g. caterpillar tracks) to enable the apparatus 10 to traverse along a lengthwise portion of the pipe. Furthermore, in this illustrative example, the apparatus 10 is also provided with motorised tracks (e.g. caterpillar tracks) which are configured to grip the umbilical cable 14 in order to enable it to be passed along a lengthwise portion of the pipe 12.

Figure 12:
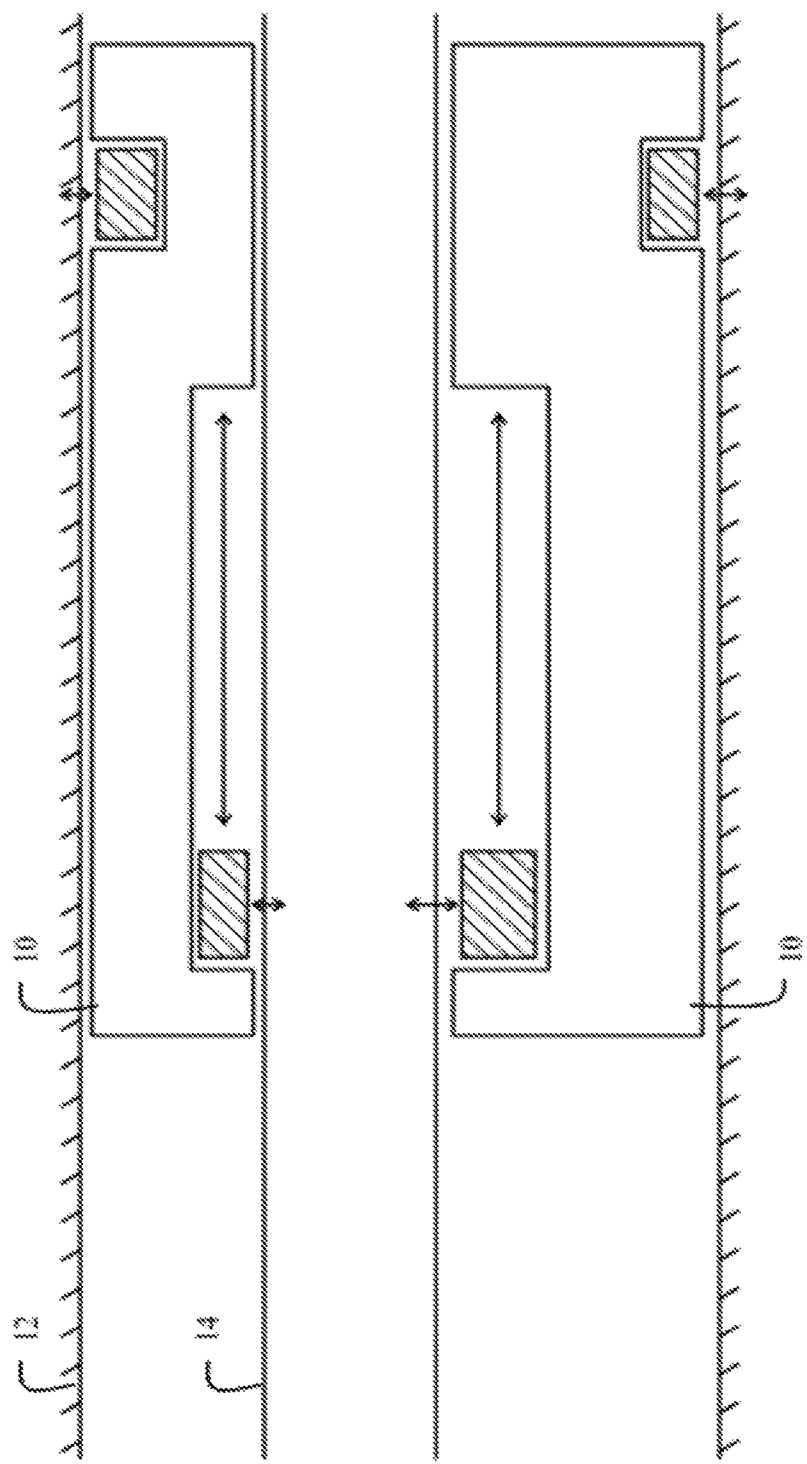
FIG. 12 shows a further example of a cable management apparatus.

FIG. 12 shows an example of the cable management apparatus 10 where the apparatus 10 is provided with a retractable clamping mechanism which may be configured to grip, in a deployed state, the umbilical cable 14. The clamping mechanism may be further configured to be movable in a lengthwise direction along the apparatus 10 such that when the cable is gripped by the clamping mechanism, the umbilical cable 14 may be moved along both a lengthwise portion of the apparatus 10 and consequently along a lengthwise portion of the pipe 12. In this illustrative embodiment, the apparatus 10 may also be provided with a set of brakes which are configured to retractably engage a portion of an interior surface of the pipe 12 so as to prevent movement of the apparatus 10 whilst it is in operation as described above.

The invention claimed is:

1. A cable management apparatus for deployment within a pipe, the pipe housing at least a portion of an umbilical cable, the cable management apparatus comprising:

a first engagement portion for engaging with an interior surface of the pipe to secure, in a fixed position, the cable management apparatus with the interior surface of the pipe;

a second engagement portion for engaging with the umbilical cable to secure, in a fixed position, the cable management apparatus with the umbilical cable;

a first end; and, a second end;

wherein the cable management apparatus is configured:

such that, in use, the umbilical cable extends outwardly and away along the pipe, in substantially opposite directions from the first and second ends; and, to assist the moving of the umbilical cable along a lengthwise portion of the pipe using at least:

the first engagement portion; and/or, the second engagement portion.

2. The cable management apparatus of claim 1 wherein:

the second engagement portion secures, in a fixed position, the umbilical cable with respect to the cable management apparatus;

the first engagement portion secures, in a fixed position, the cable management apparatus with respect to the interior surface of the pipe;

the cable management apparatus being configured to secure a portion of the umbilical cable in a fixed position with respect to the interior surface of the pipe by the first and second engagement portions.

3. The cable management apparatus of claim 1, comprising any one or more of:

a first driving mechanism for moving the cable management apparatus with respect to the pipe; or a second driving mechanism for moving the umbilical cable with respect to the cable management apparatus.

4. The cable management apparatus of claim 3, wherein the cable management apparatus actively assists the movement of the umbilical cable by driving the umbilical cable along the lengthwise portion of the pipe using any of:

I) the first engagement portion and the second driving mechanism, where the first engagement portion secures, in a fixed position, the cable management apparatus with the interior surface of the pipe;

II) the second engagement portion and the first driving mechanism, where the second engagement portion secures, in a fixed position, the cable management apparatus with the umbilical cable;

III) the first and second driving mechanism.

5. The cable management apparatus of claim 1, where the second engagement portion comprises:

a rolling bearing mechanism for contacting the umbilical cable; and/or a surface for contacting the umbilical cable.

6. The cable management apparatus of claim 5 passively assists the movement of the umbilical cable by using the second engagement portion and the first engagement portion as, where the first engagement portion secures, in a fixed position, the cable management apparatus with the interior surface of the pipe.

7. The cable management apparatus as claimed in claim 1, and having at least two deployment states selected from:

I) a static deployment state wherein:

the second engagement portion secures, in a fixed position, the umbilical cable with respect to the cable management apparatus;

the first engagement portion secures, in a fixed position, the cable management apparatus with respect to the interior surface of the pipe;

such that the cable management apparatus secures a portion of the umbilical cable in a fixed position with respect to the interior surface of the pipe by the first and second engagement portions;

II) an active deployment state wherein the cable management apparatus comprises any one or more of:

a first driving mechanism for moving the cable management apparatus with respect to the pipe; or a second driving mechanism for moving the umbilical cable with respect to the cable management apparatus and wherein the cable management apparatus actively assists the movement of the umbilical cable by driving the umbilical cable along the lengthwise portion of the pipe using any of:

i) the first engagement portion and the second driving mechanism, where the first engagement portion secures, in a fixed position, the cable management apparatus with the interior surface of the pipe;

ii) the second engagement portion and the first driving mechanism, where the second engagement portion secures, in a fixed position, the cable management apparatus with the umbilical cable;

III) a passive deployment state where the second engagement portion comprises:

a rolling bearing mechanism for contacting the umbilical cable; and/or a surface for contacting the umbilical cable;

and wherein the cable management apparatus passively assists the movement of the umbilical cable by using the second engagement portion and the first engagement portion, where the first engagement portion secures, in a fixed position, the cable management apparatus with the interior surface of the pipe.

8. The cable management apparatus of claim 7, wherein the cable management apparatus is configured to transition between any of the said states upon a signal indicative of a parameter associated with any one or more of:

I) a position of the cable management apparatus with respect to the pipe;

II) a state of the umbilical cable; or

III) a state of the cable management apparatus.

9. The cable management apparatus of claim 8 where the cable management apparatus comprises one or more sensors for determining any of the said parameters described in claim 8.

10. The cable management apparatus of claim 9, wherein the one or more sensors comprise any one or more of:

I) an odometer configured to determine the distance travelled by the cable management apparatus lengthwise along the pipe;

II) an inclinometer configured to determine the inclination of the cable management apparatus with respect to gravity;

III) an accelerometer configured to determine the movement of the cable management apparatus in at least one three-dimensional plane.

11. The cable management apparatus of claim 9, wherein the at least one of the one or more sensors are further configured to determine a physical parameter of the umbilical cable.

12. The cable management apparatus of claim 11, wherein the physical parameter comprises the tension of the umbilical cable.

13. The cable management apparatus of claim 11, wherein physical parameter comprises the velocity of the umbilical cable.

14. The cable management apparatus of claim 7, configured to receive a control signal from an external system, the control signal for initiating the transition from one of the said:

static deployment state;

active deployment state; or passive deployment state;

to another of the said states.

15. The cable management apparatus of claim 1, wherein the cable management apparatus is further provided with a propulsion mechanism for propelling itself along the pipe.

16. A system comprising a plurality of cable management apparatus of claim 1.

17. A cable management apparatus for deployment within a pipe, the pipe housing at least a portion of an umbilical cable, the cable management apparatus comprising:

a first engagement portion for engaging with an interior surface of the pipe; and, a second engagement portion for engaging with the umbilical cable;

a first driving mechanism for moving the cable management apparatus with respect to the pipe;

a second driving mechanism for moving the umbilical cable with respect to the cable management apparatus;

a first end; and, a second end;

wherein the cable management apparatus is configured:

such that, in use, the umbilical cable extends outwardly and away along the pipe, in substantially opposite directions from the first and second ends; and, to assist the moving of the umbilical cable along a lengthwise portion of the pipe using at least:

the first engagement portion; and/or, the second engagement portion.

* * * * *